US012311670B2

(12) United States Patent
Yoneyama et al.

(10) Patent No.: US 12,311,670 B2
(45) Date of Patent: May 27, 2025

(54) LIQUID EJECTING UNIT AND LIQUID EJECTING APPARATUS

(71) Applicant: SEIKO EPSON CORPORATION, Tokyo (JP)

(72) Inventors: Ichiro Yoneyama, Shiojiri (JP); Yoshiki Sugawara, Mikawa-machi (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 18/317,634

(22) Filed: May 15, 2023

(65) Prior Publication Data

US 2023/0364918 A1 Nov. 16, 2023

(30) Foreign Application Priority Data

May 16, 2022 (JP) ................................ 2022-079996

(51) Int. Cl.
*B41J 2/175* (2006.01)
*B41J 2/14* (2006.01)
*B41J 2/235* (2006.01)

(52) U.S. Cl.
CPC ............ *B41J 2/1752* (2013.01); *B41J 2/235* (2013.01); *B41J 2002/14362* (2013.01); *B41J 2002/14411* (2013.01)

(58) Field of Classification Search
CPC ...................... B41J 2/1752; B41J 2/235; B41J 2002/14362; B41J 2002/14411
See application file for complete search history.

(56) References Cited

U.S. PATENT DOCUMENTS

2023/0126898 A1* 4/2023 Kubota .................. B41J 25/003 347/37

FOREIGN PATENT DOCUMENTS

JP 2003-211700 A 7/2003

* cited by examiner

*Primary Examiner* — Thinh H Nguyen
(74) *Attorney, Agent, or Firm* — WORKMAN NYDEGGER

(57) ABSTRACT

A liquid ejecting unit includes: a print head having a first electrically coupling portion and configured to eject ink; an electric member having a second electrically coupling portion configured to couple the first electrically coupling portion; a support portion for supporting the print head; a shaft protruding from the support portion in a protruding direction; and a fixing member, the print head has a head through hole, the electric member has a first through hole, and the print head and the electric member are fixed to the support portion by engagement between the shaft and the fixing member in a state in which the shaft is inserted into the head through hole and the first through hole in this order.

19 Claims, 26 Drawing Sheets

LIQUID EJECTING UNIT AND LIQUID EJECTING APPARATUS

The present application is based on, and claims priority from JP Application Serial Number 2022-079996, filed May 16, 2022, the disclosure of which is hereby incorporated by reference herein in its entirety.

BACKGROUND

1. Technical Field

The present disclosure relates to a liquid ejecting unit including a liquid ejecting head configured to eject liquid and to a liquid ejecting apparatus including the liquid ejecting unit.

2. Related Art

A liquid ejecting apparatus is an apparatus including a liquid ejecting unit including a liquid ejecting head and configured to eject various kinds of liquid as droplets from the liquid ejecting head.

As such a liquid ejecting unit, a configuration in which a flow path member and a connector, which is an example of an electric member, are fixed to a print head, which is an example of a liquid ejecting head, with screws, and in which the print head is fixed to a carriage, which is an example of a support portion, with a plate spring is disclosed (for example, JP-A-2003-211700).

However, in a liquid ejecting unit with the configuration of JP-A-2003-211700, since fixation of the liquid ejecting head to the support portion and fixation of the members to be coupled to the liquid ejecting head such as a flow path member and a connector have to be performed separately in replacement of the liquid ejecting head, there is a problem that replacement of the liquid ejecting head is not easy.

Such a problem exists not only in liquid ejecting units configured to eject ink but also in liquid ejecting units configured to eject liquid other than ink in a similar situation.

SUMMARY

An aspect of the present disclosure to solve the above problem is a liquid ejecting unit including: a liquid ejecting head having a first coupling portion and configured to eject liquid; a first member having a second coupling portion configured to couple the first coupling portion; a support portion for supporting the liquid ejecting head; a shaft protruding from the support portion in a protruding direction; and a fixing member, in which the liquid ejecting head has a head through hole, the first member has a first through hole, and the liquid ejecting head and the first member are fixed to the support portion by engagement between the shaft and the fixing member in a state in which the shaft is inserted into the head through hole and the first through hole in this order.

Another aspect of the present disclosure is a liquid ejecting unit including: a liquid ejecting head having a first coupling portion and configured to eject liquid; a first member having a second coupling portion configured to couple the first coupling portion; a support portion for supporting the liquid ejecting head; and a fixing member, in which the liquid ejecting head has a shaft protruding in a protruding direction, the first member has a first through hole, the support portion has a shaft through hole, the shaft has a thread groove at an end portion of the shaft in the protruding direction, the shaft is press-fitted into the shaft through hole, and the liquid ejecting head and the first member are fixed to the support portion by thread engagement between the fixing member and the thread groove in a state in which the shaft is inserted into the first through hole and the shaft through hole.

Still another aspect of the present disclosure is a liquid ejecting apparatus including: the liquid ejecting unit of the above aspects; and a liquid storing portion configured to store liquid to be supplied to the liquid ejecting unit.

DESCRIPTION OF EXEMPLARY EMBODIMENTS

Figure 1:
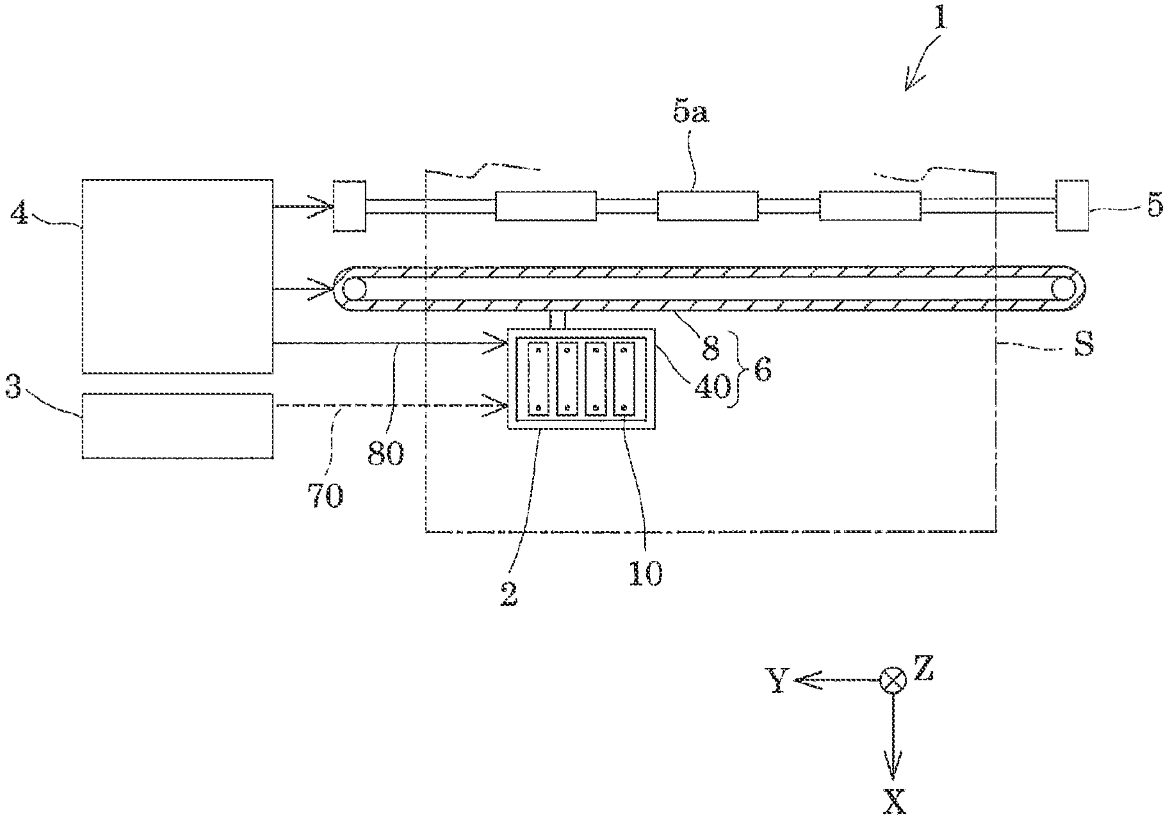
FIG. 1 is a diagram illustrating an overall configuration of a printing apparatus according to Embodiment 1.

Hereinafter, the present disclosure will be described in detail with reference to embodiments. However, the following description is only to show aspects of the present disclosure, and hence, the embodiments can be changed as appropriate within the scope of the present disclosure. In each figure, members having the same reference numerals are the same members, description of which is omitted as appropriate. In each figure, X, Y, and Z represent three spatial axes orthogonal to one another. In the present specification, the directions of these axes are referred to as the X direction, the Y direction, and the Z direction. In the following description, directions in each figure indicated by arrows are referred to as the positive (+) directions, and the directions opposite to the arrows are referred to as the negative (−) directions. In the following description, the directions of the three spatial axes of X, Y, and Z not limited to either the positive or negative direction are referred to as the X-axis direction, the Y-axis direction, and the Z-axis direction.

Embodiment 1

FIG. 1 is a diagram illustrating an overall configuration of an ink jet printing apparatus 1 according to Embodiment 1 of the present disclosure.

As illustrated in FIG. 1, the ink jet printing apparatus 1, which is an example of a liquid ejecting apparatus, is a printing apparatus that performs printing of images or the like by ejecting and landing ink, which is a kind of liquid, as ink droplets onto a medium S such as a printing sheet to form arrays of dots on the medium S. Examples of the medium S used include print sheets and appropriate materials such as plastic film and cloth.

In the following description, of the three spatial axes of the X-axis, the Y-axis, and the Z-axis, the movement direction (in other words, the main scanning direction) of a liquid ejecting unit 2 described later is defined as the Y-axis direction; the transport direction of the medium S which is orthogonal to the main scanning direction is defined as the X-axis direction; the plane parallel to the nozzle surface in which nozzles 11 of an ink jet print head 10 (see FIG. 6) are formed is defined as the XY plane; and a direction intersecting the nozzle surface, which is the XY plane, in other words the direction orthogonal to the XY plane in the present embodiment, is defined as the Z-axis direction. Ink droplets are ejected in the +Z direction.

As illustrated in FIG. 1, the ink jet printing apparatus 1 includes the liquid ejecting unit 2, a liquid container 3, a control unit 4 which is a controller, a transport mechanism 5 that sends out the medium S, and a movement mechanism 6.

The liquid ejecting unit 2, which will be described later in detail, includes the ink jet print head 10 (hereinafter, simply also referred to as a print head) that ejects the ink supplied from the liquid container 3 as ink droplets. The ink jet print head 10 is an example of a liquid ejecting head, and the liquid container 3 is an example of a liquid storing portion.

The liquid containers 3 respectively store a plurality of kinds of ink (for example, a plurality of colors) that are ejected from the liquid ejecting unit 2. Examples of the liquid container 3 include cartridges configured to be attached to and detached from the ink jet printing apparatus 1, ink packs in the form of a bag formed of a flexible film, and ink tanks to which ink can be added. The liquid containers 3 respectively store a plurality of kinds of ink having, for example, different colors, different components, or the like. The liquid container 3 may be composed of a main tank and a sub-tank. A configuration in which a sub-tank is coupled to the liquid ejecting unit 2 and in which the ink consumed by ink droplets being ejected from the liquid ejecting unit 2 is replenished from a main tank to the sub-tank is possible.

The control unit 4 includes, for example, a control device such as a central processing unit (CPU) or a field programmable gate array (FPGA) and a storage device such as semiconductor memory. The control unit 4 performs overall control of the components of the ink jet printing apparatus 1, specifically, the liquid ejecting unit 2, the transport mechanism 5, the movement mechanism 6, and the like, by the control device executing a program stored in the storage device.

The transport mechanism 5 has a transport roller 5*a* and is configured to transport the medium S in the X-axis direction. Specifically, the transport mechanism 5 transports the medium S in the X-axis direction by rotation of the transport roller 5*a*. The transport mechanism 5 configured to transport the medium S is not limited to a transport mechanism including a transport roller 5*a* and may be, for example, a transport mechanism configured to transport the medium S by using a belt or a drum.

The movement mechanism 6 includes a support portion 40 and a transport belt 8 and is configured to reciprocate the liquid ejecting unit 2 in the Y-axis direction. The support portion 40 is part of the liquid ejecting unit 2 and is a so-called carriage configured to support the print head. The support portion 40 is fixed to the transport belt 8. The transport belt 8 is an endless belt disposed in the Y-axis direction. The transport belt 8 rotates under control of the control unit 4, so that the print head 10 reciprocates in the Y-axis direction together with the support portion 40. Note that a configuration in which the support portion 40 carries the liquid container 3 together with the print head 10 is possible. In the present embodiment, the support portion 40 and the print head 10 are parts of the liquid ejecting unit.

The print head 10, under control of the control unit 4, performs an ejection operation of ejecting the ink supplied from the liquid container 3 as ink droplets in the +Z direction from a plurality of nozzles onto the medium S. The ejection operation by this print head 10 is performed in parallel with transport of the medium S by the transport mechanism 5 and reciprocation of the print head 10 by the movement mechanism 6, so that images are formed on a surface of the medium S in ink, in other words, so-called printing is performed.

Figure 2:
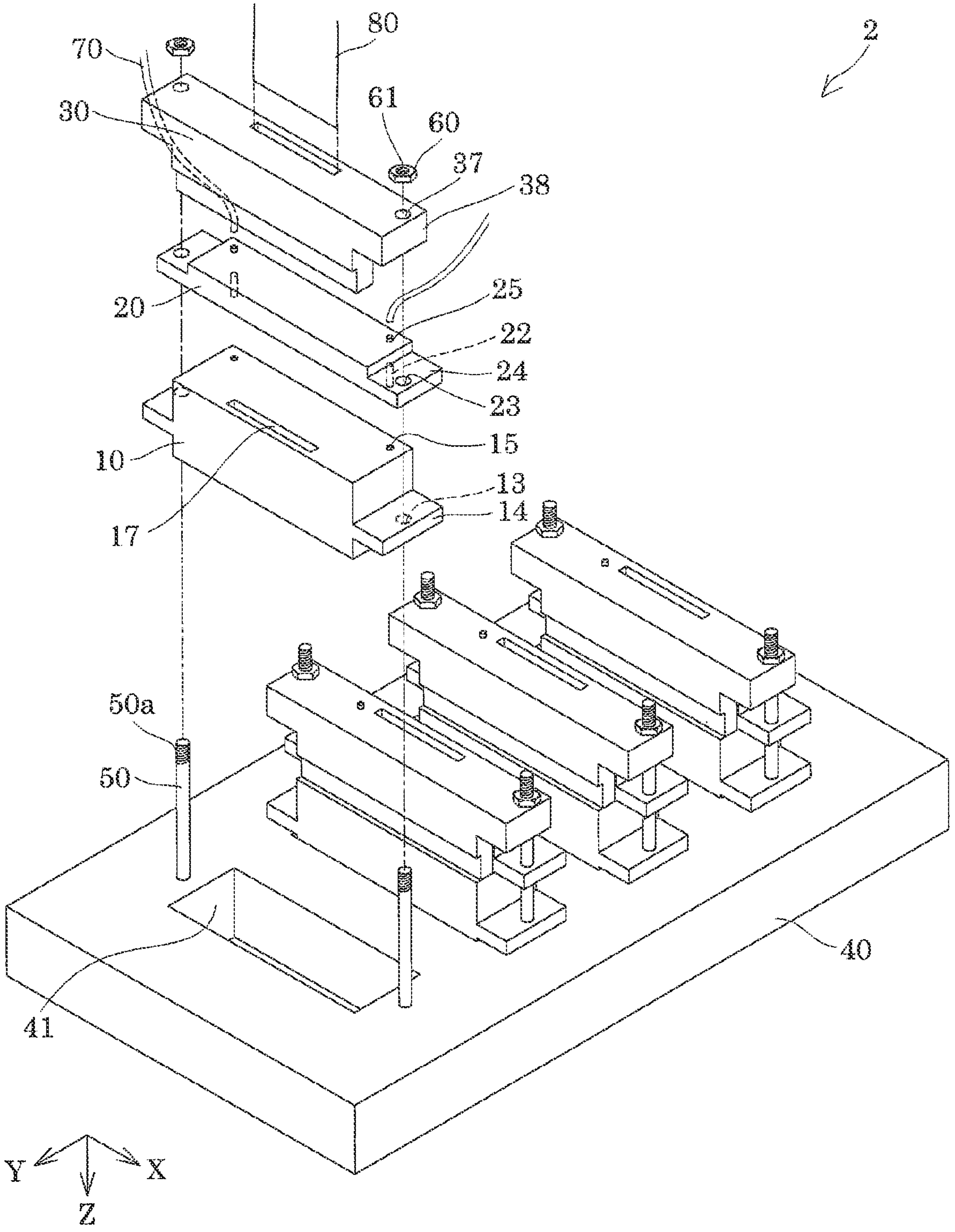
FIG. 2 is an exploded perspective view of a liquid ejecting unit according to Embodiment 1.
Figure 3:
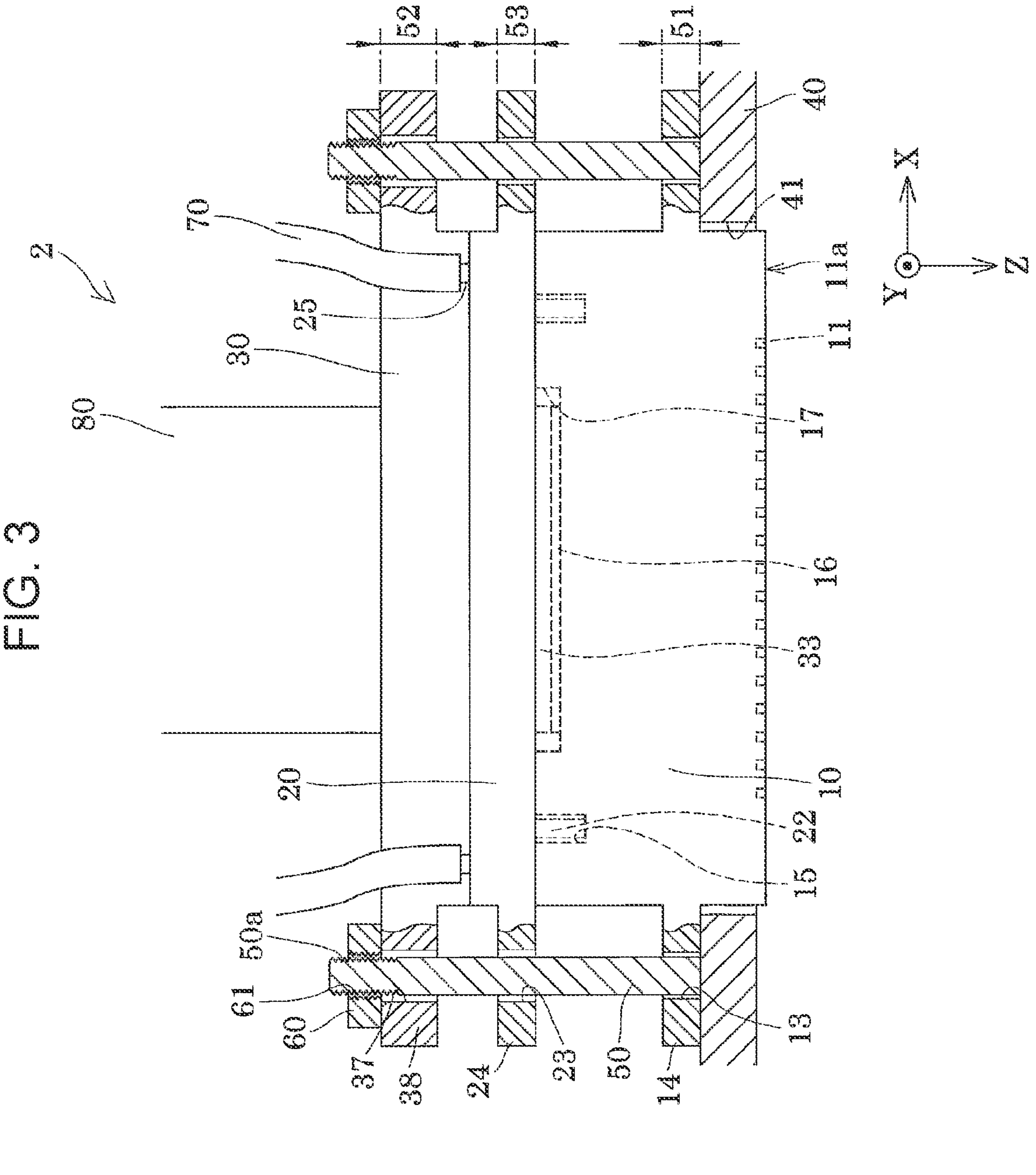
FIG. 3 is a cross-sectional view of an important part of the liquid ejecting unit according to Embodiment 1.
Figure 4:
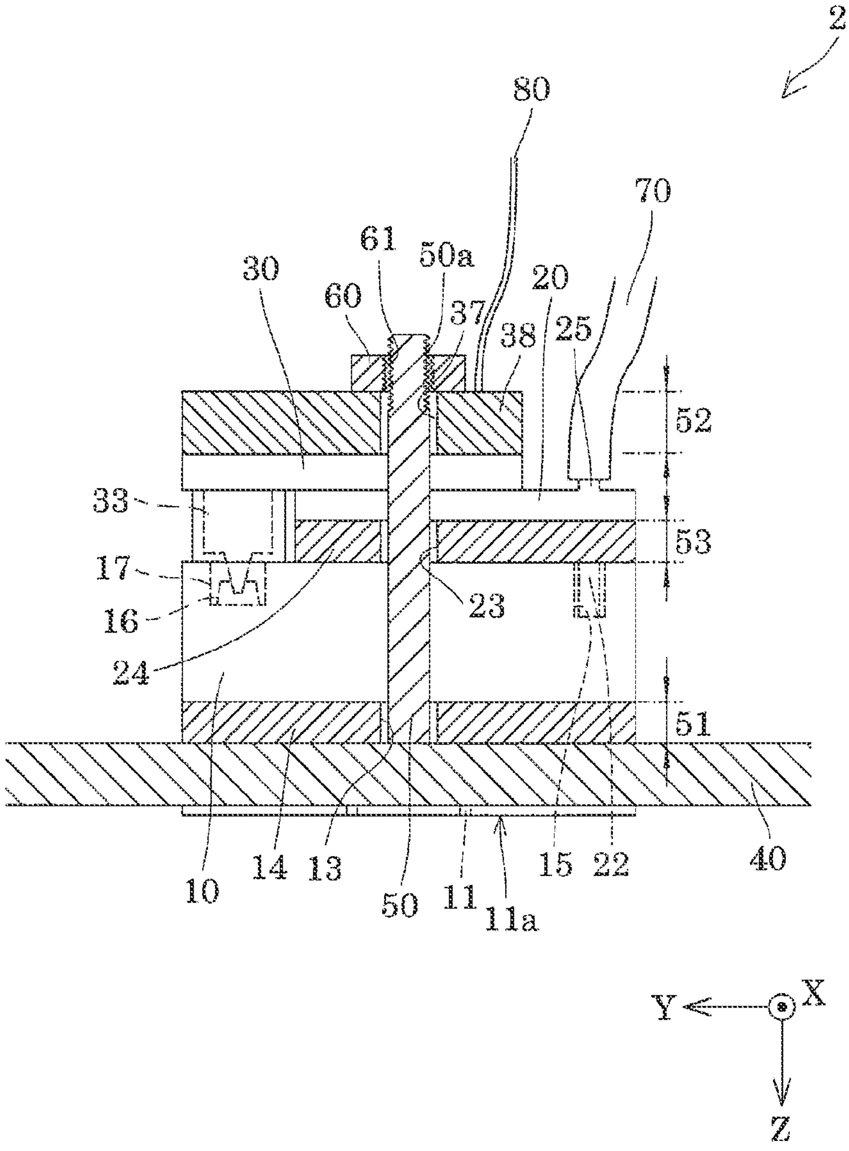
FIG. 4 is a cross-sectional view of an important part of the liquid ejecting unit according to Embodiment 1.
Figure 5:
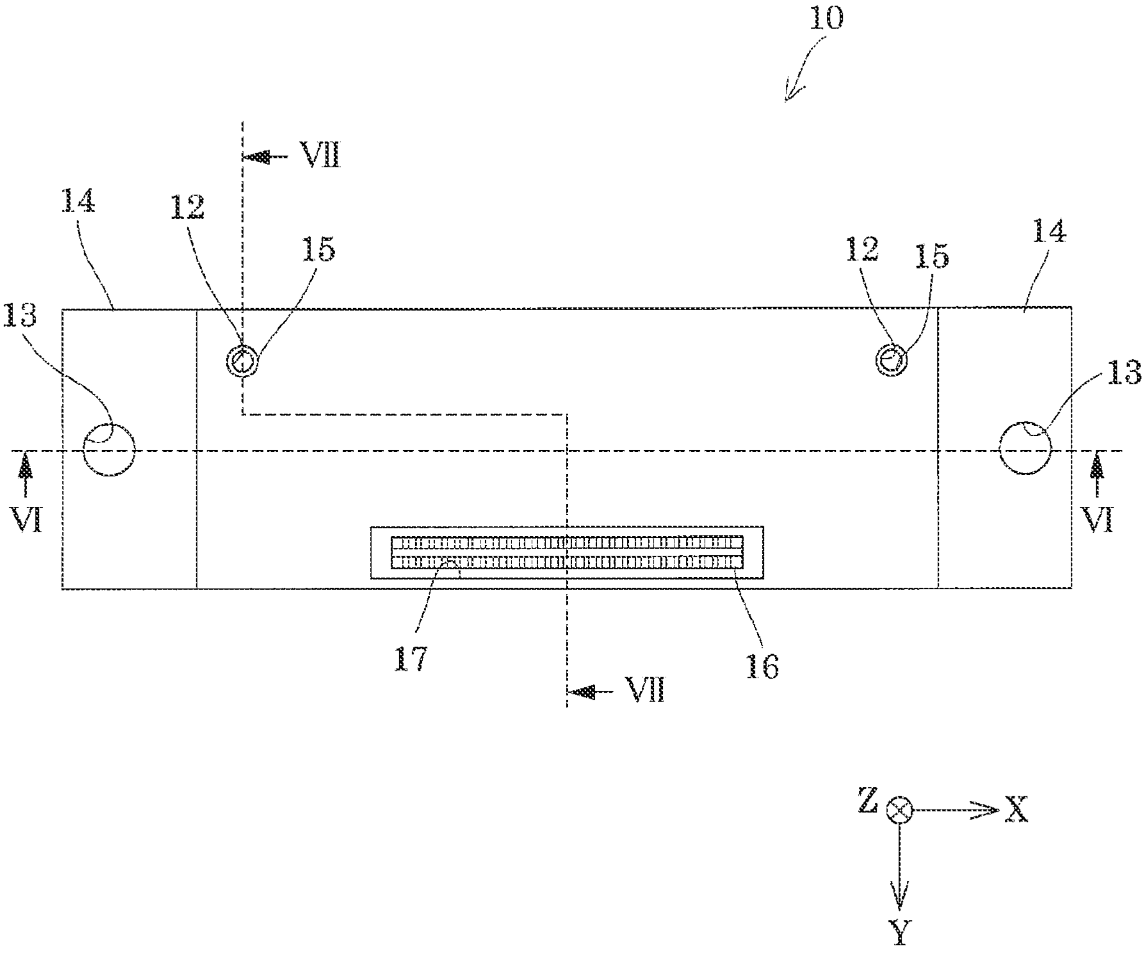
FIG. 5 is a plan view of a print head according to Embodiment 1.
Figure 6:
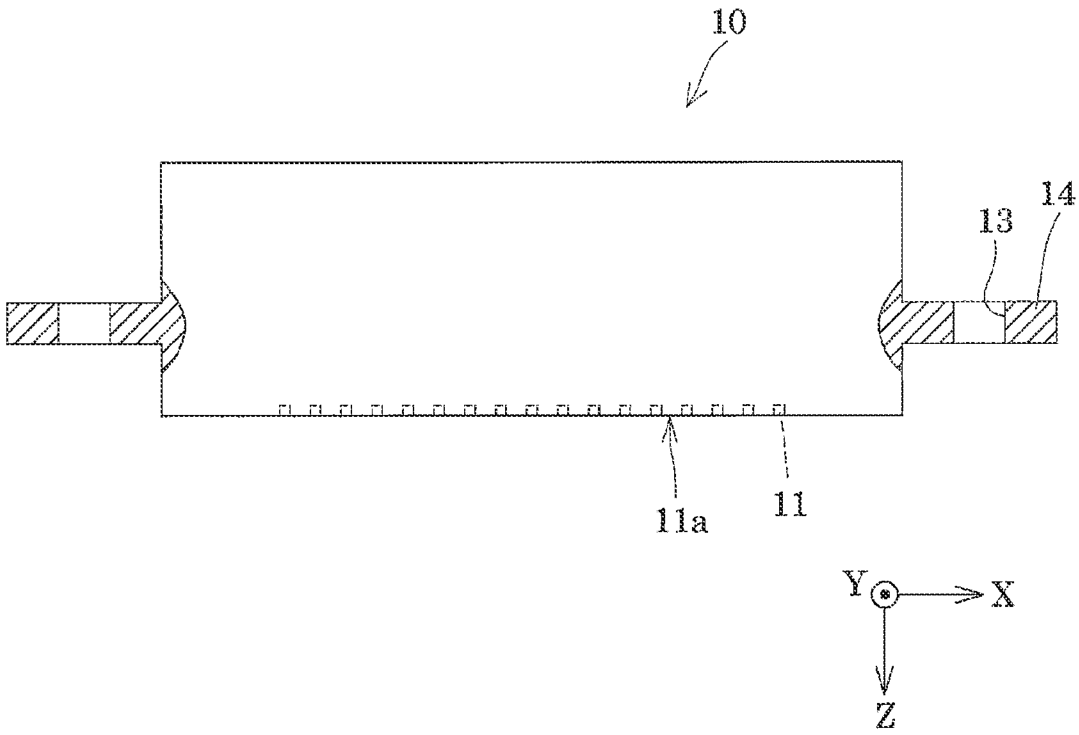
FIG. 6 is a cross-sectional view of an important part of the print head according to Embodiment 1.
Figure 7:
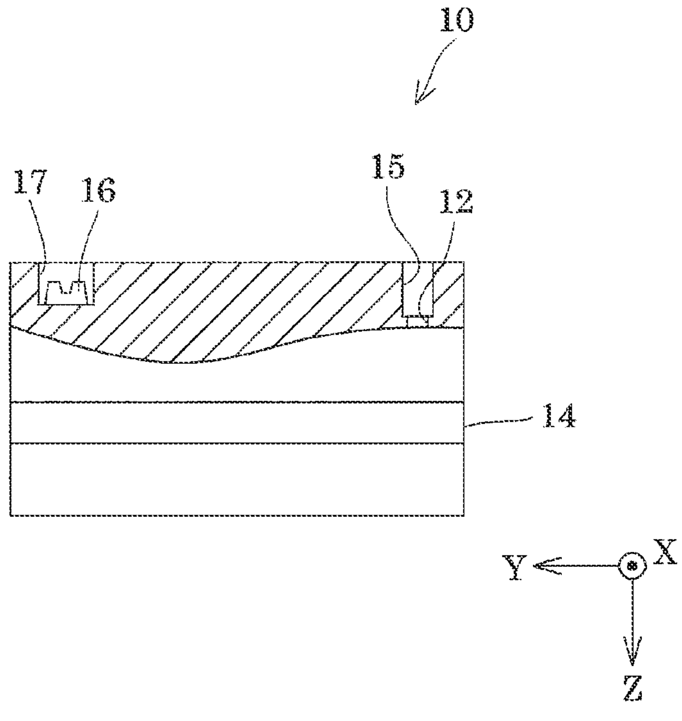
FIG. 7 is a cross-sectional view of an important part of the print head according to Embodiment 1.
Figure 8:
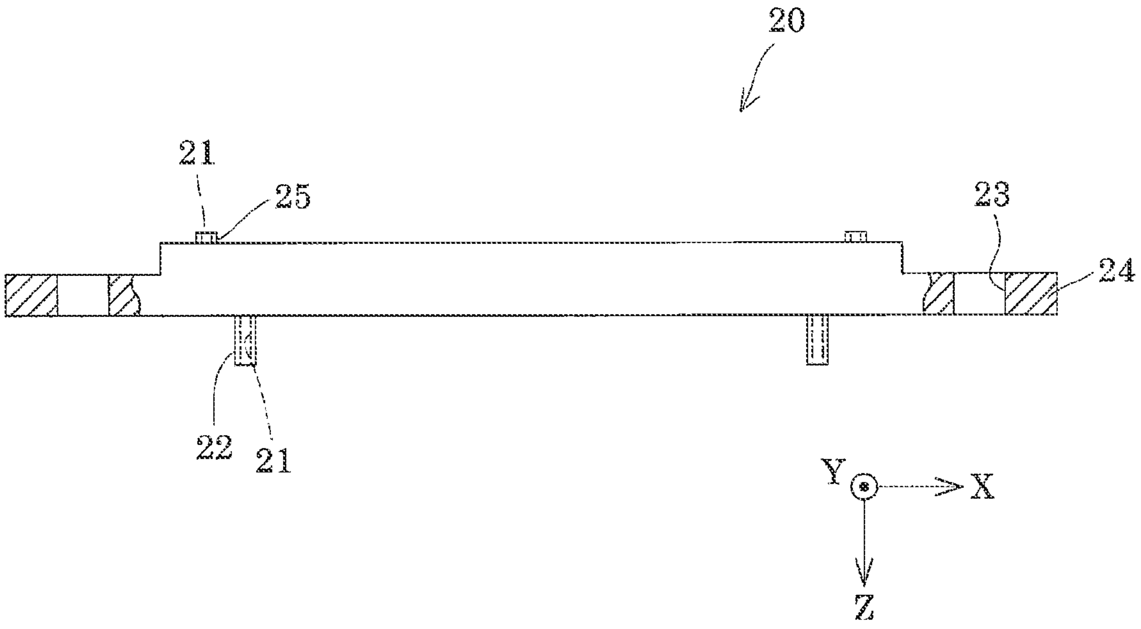
FIG. 8 is a cross-sectional view of an important part of a flow path member according to Embodiment 1.
Figure 9:
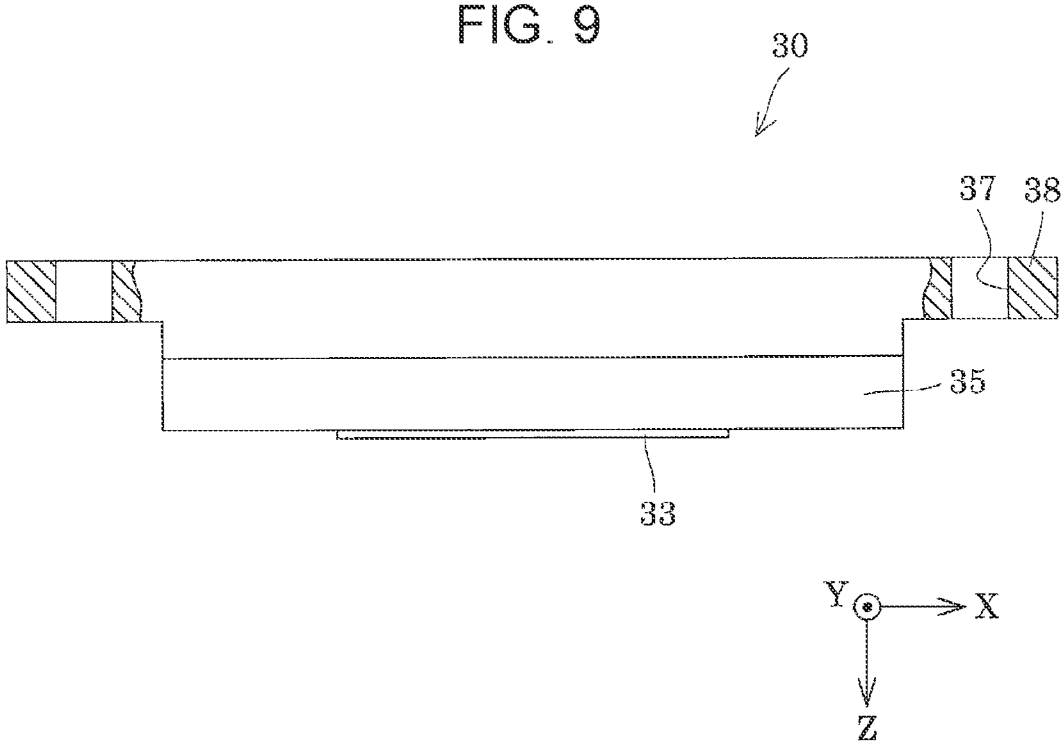
FIG. 9 is a cross-sectional view of an important part of an electric member according to Embodiment 1.
Figure 10:
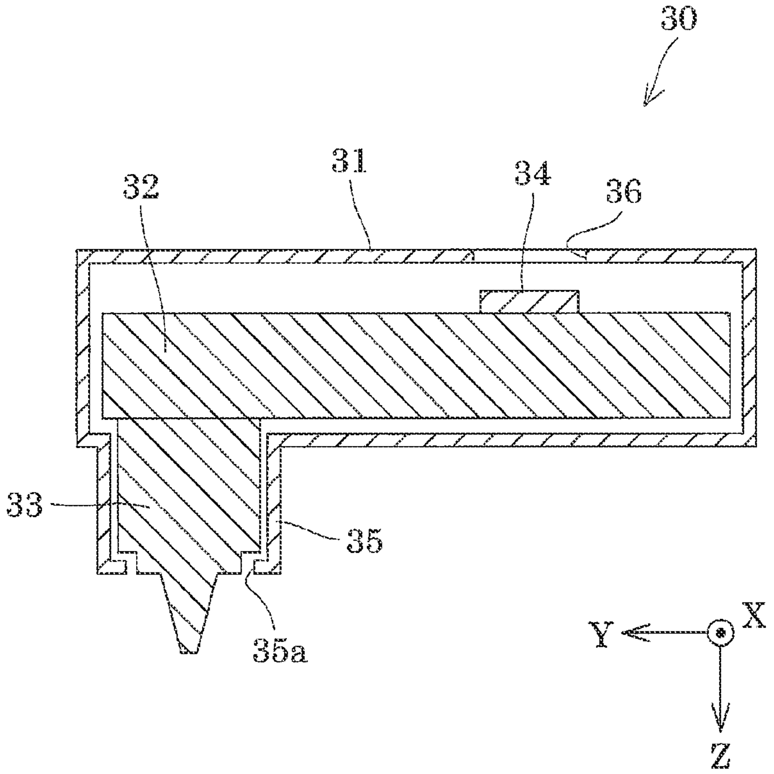
FIG. 10 is a cross-sectional view of an important part of the electric member according to Embodiment 1.

FIG. 2 is an exploded perspective view of the liquid ejecting unit 2. FIG. 3 is a cross-sectional view parallel to the XZ plane of an important part of the liquid ejecting unit 2. FIG. 4 is a cross-sectional view parallel to the YZ plane of an important part of the liquid ejecting unit 2. FIG. 5 is a plan view of the print head 10 in the +Z direction. FIG. 6 is a partial cross-sectional view of an important part taken along line VI-VI in FIG. 5. FIG. 7 is a partial cross-sectional view of an important part taken along line VII-VII in FIG. 5. FIG. 8 is a cross-sectional view parallel to the XZ plane of an important part of a flow path member 20. FIG. 9 is a cross-sectional view parallel to the XZ plane of an important part of the flow path member 20. FIG. 10 is a cross-sectional view parallel to the YZ plane of an important part of an electric member 30.

As illustrated in FIGS. 2 to 4, the liquid ejecting unit 2 of the present embodiment includes the print heads 10, the flow path members 20, the electric members 30, the support portion 40, the shafts 50, and fixing members 60.

As illustrated in FIGS. 5 to 7, the print head 10 includes the nozzles 11 configured to eject ink as ink droplets, first flow paths 12 communicating with the nozzles 11, and a pressure generation unit (not illustrated) configured to generate pressure changes in the ink in the first flow paths 12. The nozzles 11 are provided in the +Z direction-facing surface of the print head 10. In the present embodiment, the surface in which these nozzles 11 are formed is referred to as the nozzle surface 11*a*. The pressure generation unit may be, for example, a piezoelectric actuator that has a piezoelectric material configured to exhibit electrical-mechanical conversion functionality and that deforms to change the capacity of the flow path, thereby causing a pressure change in the ink in the flow path to eject ink droplets through the nozzle 11. Alternatively, the pressure generation unit may be, for example, one in which a heat generating element is disposed in the first flow path 12 and in which heat generation by the heat generating element generates bubbles, which causes ink droplets to be ejected through the nozzle 11. Further, the pressure generation unit may be a so-called electrostatic actuator in which an electrostatic force is generated between a vibration plate and an electrode and deforms the vibration plate to eject ink droplets through the nozzle 11.

The print head 10 has first positioning holes 13 passing through the print head 10 in the Z-axis direction. The first positioning hole 13 of the present embodiment corresponds to a head through hole. The first positioning hole 13 is provided in each of the first flange portions 14 provided at both end portions in the X-axis direction of the print head 10 so as to pass through the first flange portion 14 in the Z-axis direction. The first positioning hole 13 of the present embodiment has a circular shape as viewed in the Z-axis direction. However, the shape of the first positioning hole 13 viewed in the Z-axis direction is not particularly limited to this shape and may be polygonal, elliptical, or oval. The first positioning hole 13 has the same opening shape and a constant opening area in the Z-axis direction. However, the first positioning hole 13 may have different opening shapes in the Z-axis direction and may have a shape in which the opening area gradually decreases or increases in the Z-axis direction.

The −Z direction-facing surface of the print head 10 has first flow-path coupling portions 15 and a first electrically coupling portion 16. The first flow-path coupling portion 15 has a recessed shape open in the −Z direction-facing surface of the print head 10. The first flow-path coupling portion 15 has a circular opening as viewed in the Z-axis direction. The surface on the +Z direction side, which is the bottom surface, of the first flow-path coupling portion 15 has an opening of the first flow path 12 communicating with the nozzle 11. In other words, the first flow-path coupling portion 15 communicates with the first flow path 12. This first flow-path coupling portion 15 is coupled in a liquid-tight manner to a second flow-path coupling portion 22 of the flow path member 20 the details of which will be described later. In the present embodiment, one print head 10 has two first flow-path coupling portions 15. However, the number of first flow-path coupling portions 15 is not limited to this number and may be one or three or more. The first flow path 12 communicating with the first flow-path coupling portion 15 may be a supply path to supply ink to the print head 10 or a discharge path to discharge the ink in the print head 10 to the outside. In the present embodiment, the first flow-path coupling portion 15 of the print head 10 corresponds to a third coupling portion.

The first electrically coupling portion 16 is provided at the bottom surface of a slot portion 17 open in the −Z direction-facing surface of the print head 10 and is electrically coupled to the pressure generation unit (not illustrated) provided in the print head 10. The first electrically coupling portion 16 is electrically coupled to a second electrically coupling portion 33 of the electric member 30. The first electrically coupling portion 16 as above may be, for example, one of paired connectors for electrically coupling a plurality of wiring lines. Note that in the print head 10, a drive circuit or the like including a switching device and a sensor or the like for measuring temperature may be provided between the first electrically coupling portion 16 and the pressure generation unit. In the present embodiment, although one print head 10 has one first electrically coupling portion 16, the present disclosure is not particularly limited to this configuration. One print head 10 has two or more first electrically coupling portions 16, but the number is not particularly limited. In the present embodiment, the first electrically coupling portion 16 of the print head 10 corresponds to a first coupling portion.

The first flow-path coupling portions 15 and the first electrically coupling portion 16 described above are located so as not to interfere with one another in the −Z direction-facing surface of the print head 10. In the present embodiment, the first flow-path coupling portions 15 and the first electrically coupling portion 16 are located apart from one another in the Y-axis direction. Specifically, as illustrated in FIG. 5, the first flow-path coupling portions 15 are located in the −Y direction relative to the center of the print head 10, and the first electrically coupling portion 16 is located in the +Y direction relative to the center of the print head 10. One of the first flow-path coupling portions 15 is located in the +X direction, and the other in the −X direction, relative to the center of the print head 10. The first electrically coupling portion 16 is located at the center portion of the print head 10 in the X-axis direction.

As illustrated in FIG. 8, the flow path member 20 has inside second flow paths 21 configured to be coupled to the first flow paths 12 of the print head 10. The flow path member 20 has second flow-path coupling portions 22 configured to be coupled to the first flow-path coupling portions 15 of the print head 10. The second flow-path coupling portion 22 has a protruding shape protruding in the +Z direction from the surface facing the +Z direction and has the second flow path 21 inside such that the second flow path 21 is open at the distal end. The outer shape of the second flow-path coupling portion 22 viewed in the −Z direction is circular. In other words, the second flow-path coupling portion 22 has a cylindrical shape. In the present embodiment, the flow path member 20 corresponds to a second member, and the second flow-path coupling portion 22 corresponds to a fourth coupling portion.

The flow path member 20 viewed in the +Z direction has a size that does not cover the slot portion 17 in which the first electrically coupling portion 16 is provided. In other words, as illustrated in FIG. 4, in the Y-axis direction, the width of the flow path member 20 is smaller than the width of the print head 10. Thus, in the state in which the second flow-path coupling portions 22 of the flow path member 20 are coupled to the first flow-path coupling portions 15 of the print head 10, the first electrically coupling portion 16 and the slot portion 17 are not covered with the flow path member 20 and are exposed in the −Z direction.

The inside (not illustrated) of the flow path member 20 as above may have, for example, a filter configured to capture bubbles and foreign matter such as dust contained in ink, a valve mechanism configured to open and close according to the pressure of the downstream flow path to control the flow of the ink flowing from the upstream side to the downstream side, a heating unit such as a heater configured to heat the ink in the second flow path 21, and the like. The second flow paths 21 of the flow path member 20 may be a plurality of branched flow paths.

The flow path member 20 has second positioning holes 23 passing through the flow path member 20 in the Z-axis direction. In the present embodiment, the second positioning holes 23 of the flow path member 20 correspond to second through holes. The second positioning hole 23 is provided in each of the second flange portions 24 provided at both end portions in the X-axis direction of the flow path member 20 so as to pass through the second flange portion 24 in the Z-axis direction. The second positioning hole 23 in the present embodiment has a circular shape as viewed in the Z-axis direction. However, the shape of the second positioning hole 23 viewed in the Z-axis direction is not particularly limited to this shape and may be polygonal, elliptical, or oval. The second positioning hole 23 has the same opening shape and a constant opening area in the Z-axis direction. However, the second positioning hole 23 may have different opening shapes in the Z-axis direction and may have a shape in which the opening area gradually decreases or increases in the Z-axis direction.

The flow path member 20 has external-flow-path coupling portions 25 configured to couple the second flow paths 21 to external flow paths. The external-flow-path coupling portion 25 has a protruding shape protruding in the −Z direction from the −Z direction-facing surface of the flow path member 20 and has the second flow path 21 inside such that the second flow path 21 is open at the distal end. The outer shape of the external-flow-path coupling portion 25 viewed in the +Z direction is circular. In other words, the external-flow-path coupling portion 25 has a cylindrical shape. The external-flow-path coupling portion 25 as above is coupled to a flow path pipe 70 such as a tube forming an external flow path. Note that a configuration in which the flow path pipe 70 is fixed to the external-flow-path coupling portion 25 so as not to be detached and in which the flow path pipe 70 is part of the flow path member 20 is possible. However, the shape of the external-flow-path coupling portion 25 is not limited to a cylindrical one that is coupled to the flow path pipe 70 and may be, for example, a needle shape having a pointed end on the −Z direction side which is inserted into an ink cartridge or the like.

As illustrated in FIGS. 9 and 10, the electric member 30 includes a case member 31, a substrate 32, the second electrically coupling portion 33, and an external-wiring coupling portion 34.

The case member 31 is for housing the substrate 32, part of the second electrically coupling portion 33, and the external-wiring coupling portion 34 and has a hollow box shape.

The substrate 32 is a rigid substrate and has wiring (not illustrated), electronic components mounted on the wiring, and the like.

The second electrically coupling portion 33 is mounted on the +Z direction-facing surface of the substrate 32 and is coupled to the wiring (not illustrated) or the like of the substrate 32. The second electrically coupling portion 33 as above may be the other one of the paired connectors for electrically coupling a plurality of wiring lines. In other words, the first electrically coupling portion 16 of the print head 10 and the second electrically coupling portion 33 of the electric member 30 are one and the other of the paired connectors for electrically coupling wiring lines.

The second electrically coupling portion 33 is fixed to the +Z direction-facing surface of the substrate 32. The case member 31 has a first protruding portion 35 protruding in the −Z direction to accommodate the second electrically coupling portion 33, and the −Z direction-facing surface of the first protruding portion 35 has a first opening **35*a* through which the second electrically coupling portion 33** protrudes from the inside to the outside in the +Z direction.

The external-wiring coupling portion 34 is mounted on the −Z direction-facing surface of the substrate 32 and is coupled to the wiring (not illustrated) of the substrate 32 or the like. The external-wiring coupling portion 34 is one to which external wiring 80 such as a flexible cable is coupled and is, for example, a connector. The flexible cable is, for example, a flexible flat cable (FFC) or a flexible printed circuit (FPC). The case member 31 has an exposure opening 36 in the surface facing the −Z direction for exposing the external-wiring coupling portion 34. The external wiring 80 is inserted into the exposure opening 36 and electrically coupled to the external-wiring coupling portion 34. Note that a configuration in which the external wiring 80 is fixed to the external-wiring coupling portion 34 so as not to be detached and in which the external wiring 80 is part of the electric member 30 is possible.

The second electrically coupling portion 33 of the electric member 30 as above is electrically coupled to the first electrically coupling portion 16 of the print head 10. In the present embodiment, the electric member 30 corresponds to a first member, and the second electrically coupling portion 33 to a second coupling portion.

The electric member 30 has third positioning holes 37 passing through the electric member 30 in the Z-axis direction. The third positioning hole 37 of the present embodiment corresponds to a first through hole. The third positioning hole 37 is provided in each of the third flange portions 38 provided at both end portions in the X-axis direction of the case member 31 of the electric member 30 so as to pass through the third flange portion 38 in the Z-axis direction. The third positioning hole 37 in the present embodiment has a circular shape as viewed in the Z-axis direction. However, the shape of the third positioning hole 37 viewed in the Z-axis direction is not particularly limited to this shape and may be polygonal, elliptical, or oval.

Although the electric member 30 of the present embodiment has one substrate 32 in the case member 31, the present disclosure is not particularly limited to this configuration.

The electric member 30 may have two or more substrates 32 coupled to each other with a flexible cable or a connector in the case member 31. Although the electric member 30 has the case member 31 that covers the substrate 32 on which the second electrically coupling portion 33 is mounted, the present disclosure is not particularly limited to this configuration. For example, a configuration without the case member and having only the substrate 32 on which the second coupling portion is mounted is possible. In a configuration in which the electric member 30 has only the substrate 32 as mentioned above, the substrate 32 would have the third positioning holes 37.

As illustrated in FIGS. 2 to 4, the support portion 40 is configured to support the print heads 10 and is a so-called carriage which is part of the movement mechanism 6, as described earlier. In the present embodiment, the support portion 40 supports four print heads 10 as illustrated in FIG. 1. However, the support portion 40 may support a single print head 10. The number of print heads 10 supported by the support portion 40 is not limited to four.

The support portion 40 has second openings 41 for exposing the nozzle surfaces 11*a* in which the nozzles 11 of the print head 10 are open. The second openings 41 pass through the support portion 40 in the Z-axis direction. The second opening 41 is provided independently for each print head 10. Specifically, the support portion 40 of the present embodiment has a total of four second openings 41 to support the four print heads 10. However, a second opening 41 may be shared with a plurality of print heads 10.

The shafts 50 protrude from the support portion 40 in the −Z direction. In the present embodiment, the proximal end portion of the shaft 50 is fixed to the support portion 40, and the axial direction of the shaft 50 is parallel to the Z-axis so that the distal end portion protrudes in the −Z direction. In other words, the protruding direction in which the shaft 50 of the present embodiment protrudes is the −Z direction. Two shafts 50 are provided for each print head 10 supported by the support portion 40, so that the total number of shafts 50 is eight. The shafts 50 and the support portion 40 have an integrated structure. Here, the configuration in which the shafts 50 and the support portion 40 have an integrated structure includes a configuration in which the shafts 50 and the support portion 40 are manufactured in the same manufacturing process by injection molding or casting. In addition, the configuration in which the shafts 50 and the support portion 40 have an integrated structure includes a configuration in which the support portion 40 has fixation holes, to which the shafts 50 are press-fitted and fixed so as not to be easily detached. Further, the configuration in which the shafts 50 and the support portion 40 have an integrated structure includes a configuration in which the shafts 50 are welded and fixed to the support portion 40 so as not to be easily detached. For example, the configuration in which the shafts 50 and the support portion 40 have an integrated structure does not include the configuration in which the shafts 50 are fastened to the support portion 40 so as to be easily attached or detached. In other words, in the configuration in which the shafts 50 are fixed to the support portion 40 by fastening, the shafts 50 are referred to as separate structures. Since the shafts 50 and the support portion 40 form an integrated structure due to the use of a fixation method that enables the shafts 50 and the support portion 40 not to be easily detached from one another as described above, it is possible to prevent the fixation between the support portion 40 and the shafts 50 from loosening, compared with separate structures. Thus, it is possible to prevent the shafts 50 from inclining relative to the support portion 40 due to the loosening of the fixation and to prevent a deterioration in the accuracy in positioning the print head 10, the flow path member 20, and the electric member 30, whose positioning is guided by the shafts 50, relative to the support portion 40.

Each shaft 50 has a circular shape in cross section perpendicular to the axial direction, in other words, in cross section parallel to the XY plane defined by the X-axis and the Y-axis perpendicular to the Z-axis. In the present embodiment, the cross-sectional area of the cross section perpendicular to the Z-axis of the shaft 50 has a constant size in the Z-axis direction. In other words, the shaft 50 has a cylindrical shape in which the diameter is constant in the Z-axis direction. Note that the shape of the shaft 50 is not particularly limited to this shape. The cross section perpendicular to the Z-axis may have a polygonal shape, an elliptical shape, an oval shape, or the like.

The distal end portion of the shaft 50 protruding in the −Z direction as above is engaged with the fixing member 60. In the present embodiment, the shaft 50 and the fixing member 60 are engaged by thread engagement. Specifically, the distal end portion of the shaft 50 has a spiral thread groove 50*a* along the outer peripheral surface, and thus, the distal end portion of the shaft 50 serves as an external screw.

The fixing member 60 has a fixation hole 61 passing through the fixing member 60 in the Z-axis direction. A spiral thread groove is formed along the inner peripheral surface of the fixation hole 61, and thus, the fixing member 60 serves as an internal screw. The fixation hole 61 of the fixing member 60 serving as an internal screw is engaged with the distal end portion of the shaft 50 serving as an external screw by thread engagement, so that the shaft 50 and the fixing member 60 are engaged.

The fixing member 60 has a hexagonal outer shape as viewed in the Z-axis direction and is thus a so-called hexagon nut. Hence, the fixing member 60 can be fastened to the shaft 50 by rotating it with a tool such as a wrench.

The support portion 40 as above supports the print heads 10, the flow path members 20, and the electric members 30. Specifically, the shafts 50 and the fixing members 60 are engaged by thread engagement in the state in which the shafts 50 whose proximal ends are fixed to the support portion 40 are inserted into the first positioning holes 13 of the print head 10, the second positioning holes 23 of the flow path member 20, and the third positioning holes 37 of the electric member 30 in this order. With this operation, the print head 10, the flow path member 20, and the electric member 30 are held between the support portion 40 and the fixing members 60. The print head 10, the flow path member 20, and the electric member 30 are thus fixed to the support portion 40. Since the shafts 50 are inserted into the first positioning holes 13, the print head 10 is positioned in the XY plane relative to the shafts 50. Since the shafts 50 are inserted into the second positioning holes 23, the flow path member 20 is positioned in the XY plane relative to the print head 10 via the shafts 50. Since the shafts 50 are inserted into the third positioning holes 37, the electric member 30 is positioned relative to the print head 10 via the shafts 50.

Figure 11:
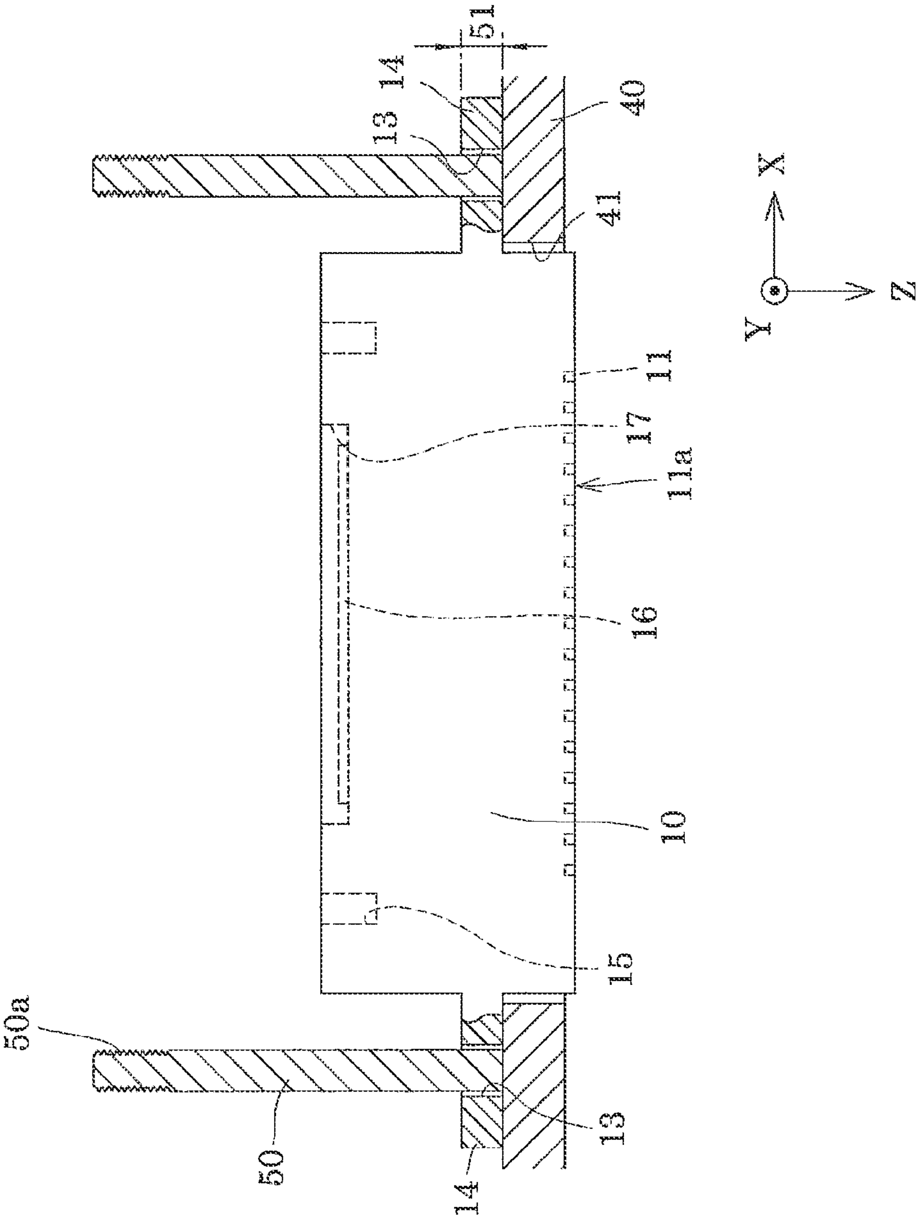
FIG. 11 is a cross-sectional view of an important part illustrating a method of manufacturing the liquid ejecting unit according to Embodiment 1.

A method of manufacturing the liquid ejecting unit 2 as above will be further described with reference to FIGS. 11 to 14. FIGS. 11 to 14 are cross-sectional views of an important part illustrating a method of manufacturing the liquid ejecting unit 2. As illustrated in FIG. 11, the shafts 50 fixed to the support portion 40 are inserted into the first positioning holes 13 of the print head 10. By inserting the shafts 50 into the first positioning holes 13 as above, the print head 10 is positioned in the XY plane relative to the shafts 50. Thus, the print head 10 is positioned in the XY plane relative to the support portion 40 via the shafts 50.

The shafts 50 are inserted into the first positioning holes 13 until the first flange portions 14 of the print head 10 come into contact with the −Z direction-facing surface of the support portion 40. By bringing the print head 10 into contact with the support portion 40 in the Z-axis direction as above, the print head 10 is positioned in the Z-axis direction relative to the support portion 40. In other words, the shafts 50 position the print head 10 relative to the support portion 40 by being inserted into the first positioning holes 13 of the print head 10.

Figure 12:
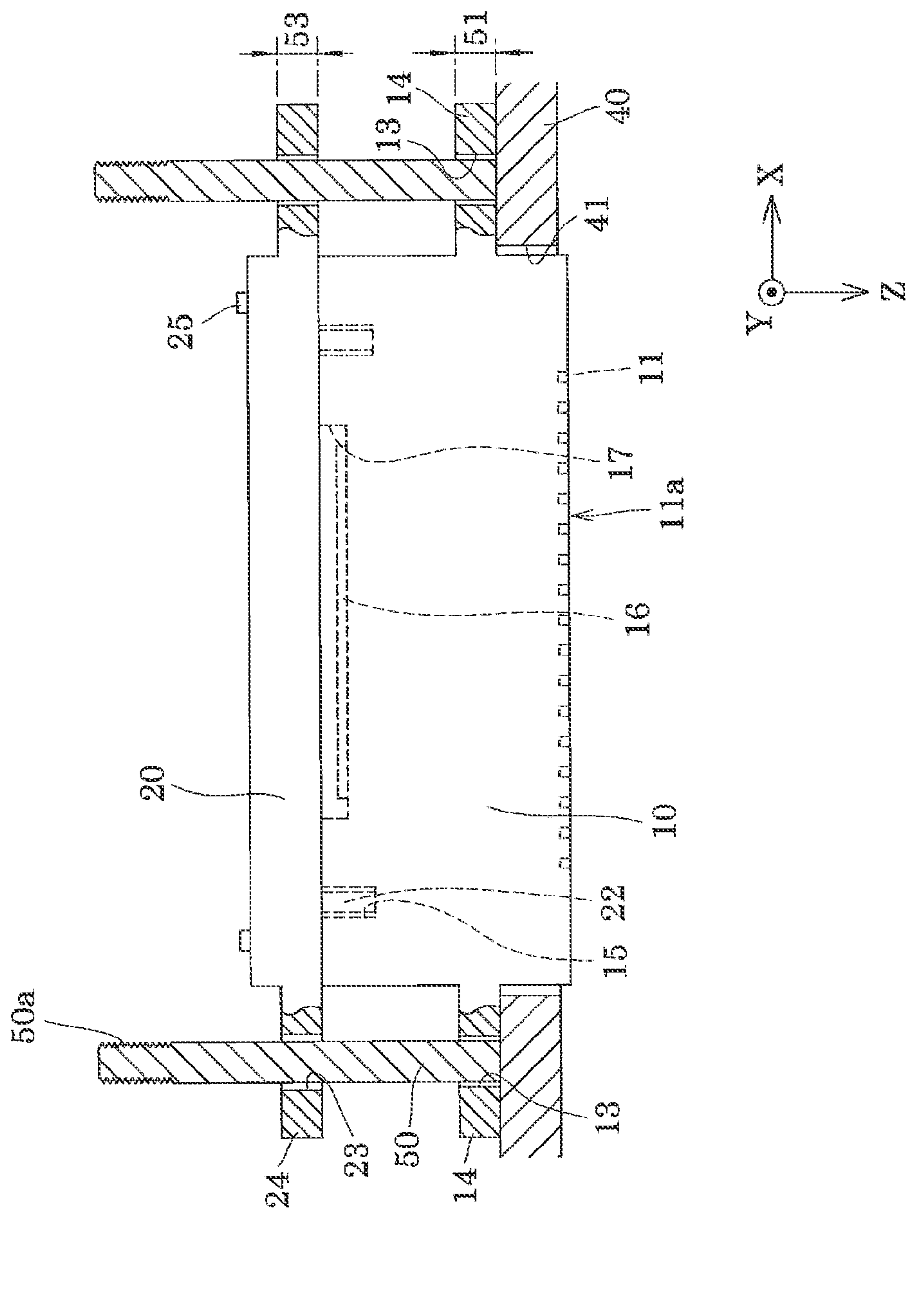
FIG. 12 is a cross-sectional view of an important part illustrating the method of manufacturing the liquid ejecting unit according to Embodiment 1.

Next, as illustrated in FIG. 12, the shafts 50 are inserted into the second positioning holes 23 of the flow path member 20. By inserting the shafts 50 into the second positioning holes 23 as above, the flow path member 20 is positioned in the XY plane relative to the shafts 50 and is thus positioned in the XY plane relative to the print head 10 via the shafts 50. The shafts 50 are inserted into the second positioning holes 23 until the second flow-path coupling portions 22 of the flow path member 20 are coupled to the first flow-path coupling portions 15 of the print head 10. In the present embodiment, the flow path member 20 is in contact with the portion other than the first electrically coupling portion 16 of the print head 10 in the state in which the first flow-path coupling portions 15 and the second flow-path coupling portions 22 are coupled. In other words, the first flow-path coupling portions 15 and the second flow-path coupling portions 22 are coupled in the state in which the −Z direction-facing surface of the print head 10 is in contact with the +Z direction-facing surface of the flow path member 20. By bringing the flow path member 20 into contact with the print head 10 in the Z-axis direction as above, the flow path member 20 is positioned in the Z-axis direction relative to the print head 10. In other words, the shafts 50 position the second flow-path coupling portions 22 relative to the first flow-path coupling portions 15 of the print head 10 by being inserted into the second positioning holes 23 of the flow path member 20.

Figure 13:
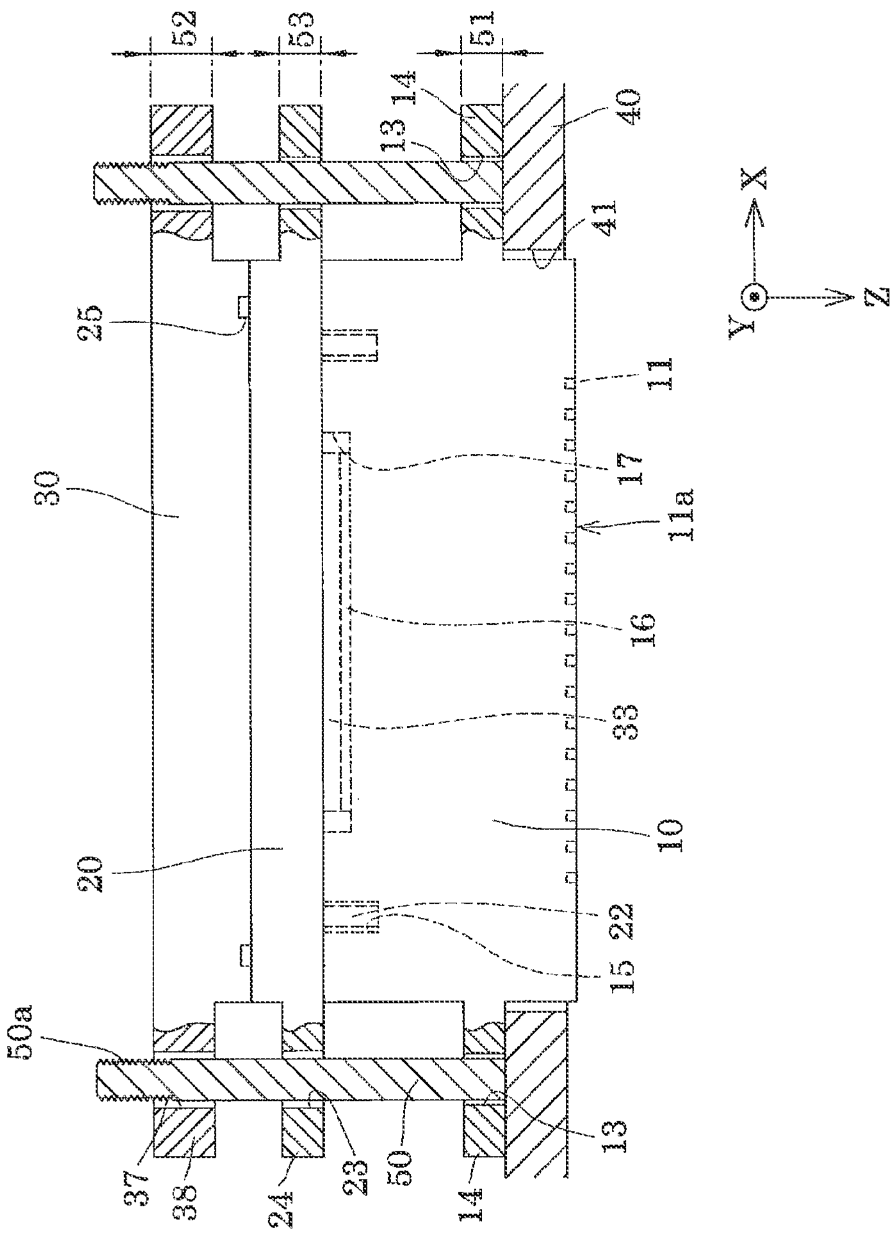
FIG. 13 is a cross-sectional view of an important part illustrating the method of manufacturing the liquid ejecting unit according to Embodiment 1.

Next, as illustrated in FIG. 13, the shafts 50 are inserted into the third positioning holes 37 of the electric member 30. By inserting the shafts 50 into the third positioning holes 37 as above, the electric member 30 is positioned in the XY plane relative to the shafts 50 and is positioned in the XY plane relative to the print head 10 via the shafts 50. The shafts 50 are inserted into the third positioning holes 37 until the second electrically coupling portion 33 of the electric member 30 is coupled to the first electrically coupling portion 16 of the print head 10. In the present embodiment, in the state in which the first electrically coupling portion 16 is coupled to the second electrically coupling portion 33, the +Z direction-facing surface of the first protruding portion 35 is in contact with the portion other than the first flow-path coupling portions 15 of the print head 10. In other words, in the state in which the −Z direction-facing surface of the print head 10 is in contact with the +Z direction-facing surface of the first protruding portion 35, the first electrically coupling portion 16 and the second electrically coupling portion 33 are coupled. By bringing the electric member 30 into contact with the print head 10 in the Z-axis direction as above, the electric member 30 is positioned in the Z-axis direction relative to the print head 10. In other words, the shafts 50 position the second electrically coupling portion 33 relative to the first electrically coupling portion 16 of the print head 10 by being inserted into the third positioning holes 37 of the electric member 30.

In the present embodiment, in the state in which the first electrically coupling portion 16 and the second electrically coupling portion 33 are coupled, the −Z direction-facing surface of the flow path member 20 is in contact with the surface facing the +Z direction other than the first protruding portion 35 of the electric member 30. By bringing the electric member 30 into contact with the flow path member 20 in the Z-axis direction as above, it is possible to hold the flow path member 20 between the electric member 30 and the print head 10 and thus to fix the print head 10, the flow path member 20, and the electric member 30 to one another.

Figure 14:
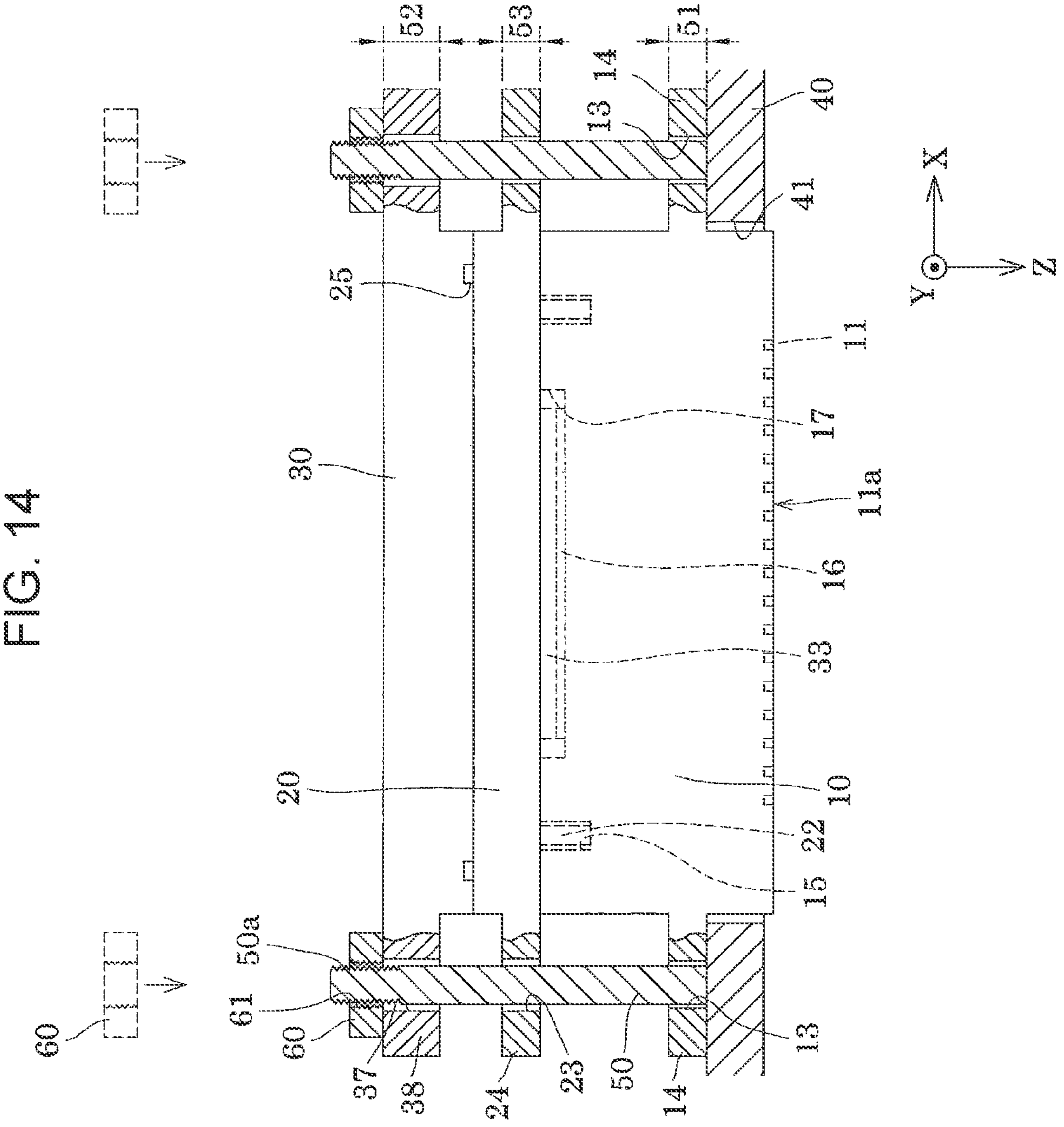
FIG. 14 is a cross-sectional view of an important part illustrating the method of manufacturing the liquid ejecting unit according to Embodiment 1.

Then, as illustrated in FIG. 14, the fixing members 60 are engaged with the distal end portions of the shafts 50 by thread engagement. Here, by fastening the fixing members 60 to the shafts 50 in the state in which the surfaces facing the +Z direction of the fixing members 60 are in contact with the −Z direction-facing surface of the third flange portions 38, it is possible to hold the print head 10, the flow path member 20, and the electric member 30 between the fixing members 60 and the support portion 40 and thus to fix the print head 10, the flow path member 20, and the electric member 30 to the support portion 40. In other words, in the state in which the print head 10, the flow path member 20, and the electric member 30 are fixed to the support portion 40, the print head 10 is in contact with the portion other than the second electrically coupling portion 33 of the electric member 30 and also in contact with the portion other than the second flow-path coupling portions 22 of the flow path member 20, and the electric member 30 is in contact with the flow path member 20. With this configuration, it is possible to stably fix the print head 10, the flow path member 20, and the electric member 30 to the support portion 40. Although in the present embodiment, there are gaps between the first flange portions 14 and the second flange portions 24 and between the second flange portions 24 and the third flange portions 38, the present disclosure is not particularly limited to this configuration. The first flange portions 14 may be in contact with the second flange portions 24 in the Z-axis direction, and the second flange portions 24 may be in contact with the third flange portions 38 in the Z-axis direction. When the flange portions of two members are in contact with each other as above, the area where the two members are in contact with each other is larger. This makes it possible to improve the positioning accuracy between the two members and to prevent deformation and damage in the flange portions.

Then, by repeating the processes illustrated in FIGS. 11 to 14 four times, the four sets of the print head 10, the flow path member 20, and the electric member 30 are fixed to the support portion 40, and the manufacturing of the liquid ejecting unit 2 illustrated in FIG. 2 is completed.

As has been described above, the liquid ejecting unit 2 of the present embodiment includes the print head 10 including the first electrically coupling portion 16 and configured to eject ink and the electric member 30 having the second electrically coupling portion 33 configured to couple the first electrically coupling portion 16. The liquid ejecting unit 2 includes the support portion 40 for supporting the print head 10, the shafts 50 protruding from the support portion 40 in the −Z direction, and the fixing members 60. The print head 10 has the first positioning holes 13, and the electric member 30 has the third positioning holes 37. In the state in which the shafts 50 are inserted into the first positioning holes 13 and the third positioning holes 37 in this order, the shafts 50 and the fixing members 60 are engaged, and this engagement fixes the print head 10 and the electric member 30 to the support portion 40.

The print head 10 has the first flow-path coupling portions 15. The liquid ejecting unit 2 also includes the flow path member 20 having the second flow-path coupling portions 22 configured to couple the first flow-path coupling portions 15. The flow path member 20 has the second positioning holes 23. In the state in which the shafts 50 are inserted into the first positioning holes 13, the second positioning holes 23, and the third positioning holes 37 in this order, the shafts 50 and the fixing members 60 are engaged, and this engagement fixes the print head 10, the electric member 30, and the flow path member 20 to the support portion 40.

Since the print head 10 can be fixed to the support portion 40, and the flow path member 20 and the electric member 30 can also be fixed to the print head 10, by only fixing the fixing members 60 to the shafts 50 as described above, replacement of the print head 10, the flow path member 20, and the electric member 30 is easily performed by disengaging the fixing members 60 from the shafts 50. In addition, since the print head 10 is positioned relative to the support portion 40, and the flow path member 20 and the electric member 30 can be positioned relative to the print head 10 by only inserting the common shafts 50 into the first positioning holes 13, the second positioning holes 23, and the third positioning holes 37, the positioning process is simpler than that in the configuration in which the print head 10, the flow path member 20, and the electric member 30 are fixed to different shafts 50. In addition, since the print head 10, the flow path member 20, and the electric member 30 can be fixed with the common shafts 50, it is possible to make the size of the print head 10, the flow path member 20, and the electric member 30 in the XY plane smaller than those in the configuration having individual mechanisms for positioning and fixing each of the print head 10, the flow path member 20, and the electric member 30. In particular, in a configuration in which the support portion 40 supports a plurality of print heads 10, it is possible to reduce the interval between the plurality of print heads 10, and this enables downsizing of the liquid ejecting unit 2. In addition, since the print head 10, the flow path member 20, and the electric member 30 can be fixed to the support portion 40 by only engaging the fixing members 60 with the shafts 50, such a task is easy even in the configuration in which the support portion 40 supports a plurality of print heads 10 as in the present embodiment, and this improves ease of assembly of the liquid ejecting unit 2.

In the liquid ejecting unit 2 of the present embodiment, the shaft 50 has the thread groove 50*a*, and in the state in which the shafts 50 are inserted into the first positioning holes 13, the third positioning holes 37, and the second positioning holes 23, the fixing members 60 are engaged with the thread grooves 50*a* by thread engagement. With this configuration, it is preferable that the print head 10, the electric member 30, and the flow path member 20 be fixed to the support portion 40 by being held between the fixing members 60 and the support portion 40.

The shaft 50 and the fixing member 60 can be engaged by thread engagement between the shaft 50 and the fixing member 60 as described above, and by fastening only the fixing members 60 to the shafts 50, the print head 10, the electric member 30, and the flow path member 20 can be reliably fixed between the fixing members 60 and the support portion 40.

In the liquid ejecting unit 2 of the present embodiment, in the state in which the print head 10, the electric member 30, and the flow path member 20 are fixed to the support portion 40, the print head 10 is in contact with the portion other than the second electrically coupling portion 33 of the electric member 30 and also in contact with the portion other than the second flow-path coupling portions 22 of the flow path member 20. In addition, it is preferable that the electric member 30 be in contact with the flow path member 20.

Since the print head 10 is in contact with the flow path member 20 and the electric member 30 in the Z-axis direction, and the flow path member 20 is in contact with the electric member 30 in the Z-axis direction, as above, it is possible to stably fix the print head 10, the flow path member 20, and the electric member 30. It is preferable that the first flange portions 14 of the print head 10 be in contact with the second flange portions 24 of the flow path member 20, and that the second flange portions 24 of the flow path member 20 be in contact with the third flange portions 38 of the electric member 30. This configuration can prevent deformation and damage in the third flange portions 38, and inclination of each member with respect to the Z-axis due to difference in degrees of tightening the fixing members 60.

It is preferable that the shafts 50 and the support portion 40 have an integrated structure in the liquid ejecting unit 2 of the present embodiment. In other words, when the shafts 50 and the support portion 40 form an integrated structure by a fixation method that enables the shafts 50 not to be easily removed, it is possible, compared with the case of separate structures, to prevent the fixation between the support portion 40 and the shafts 50 from loosening. This prevents the shafts 50 from inclining relative to the support portion 40 due to loosening of the fixation and thus prevents a deterioration in the accuracy in positioning the print head 10, the flow path member 20, and the electric member 30, which are positioned by the shaft 50, relative to the support portion 40.

Here, as illustrated in FIGS. 3 and 4, the shaft 50 has a first portion 51, a second portion 52, and a third portion 53. The first portion 51 is a portion that faces the first positioning hole 13 in the state in which the print head 10 is supported by the support portion 40. The second portion 52 is located between the first portion 51 and the thread groove 50*a* serving as an external screw and faces the third positioning hole 37 in the state in which the first electrically coupling portion 16 of the print head 10 and the second electrically coupling portion 33 of the electric member 30 are coupled. The third portion 53 is located between the first portion 51 and the second portion 52 and faces the second positioning hole 23 in the state in which the first flow-path coupling portions 15 of the print head 10 and the second flow-path coupling portions 22 of the flow path member 20 are coupled. Note that the state in which the shaft 50 faces the first positioning hole 13, the second positioning hole 23, and the third positioning hole 37 includes a state in which the outer peripheral surface of the shaft 50 is in contact with the inner peripheral surfaces of the first positioning hole 13, the second positioning hole 23, and the third positioning hole 37 and also includes a state in which there is no contact and there are gaps between the outer peripheral surface of the shaft 50 and the inner peripheral surfaces of these holes.

FIGS. 15 to 18 are cross-sectional views parallel to the XY plane of the shaft 50 and the first positioning hole 13, the second positioning hole 23, and the third positioning hole 37.

Figure 15:
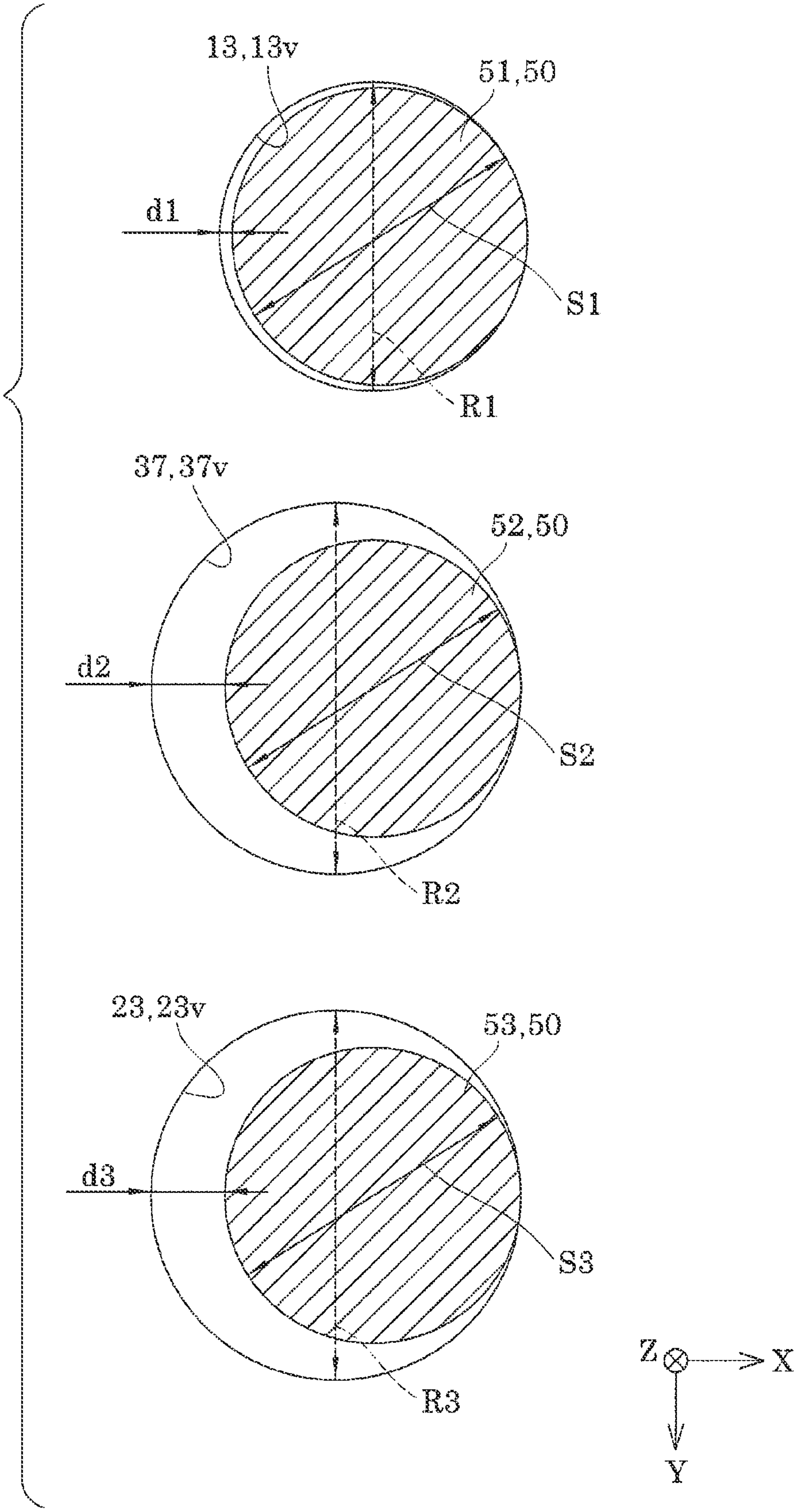
FIG. 15 illustrates cross-sectional views of important parts of a shaft and positioning holes in the liquid ejecting unit according to Embodiment 1.

As illustrated in FIG. 15, in plan view in the Z-axis direction, it is preferable that the difference d1 between the maximum dimension S1 of the first portion 51 and the diameter R1 of the maximum imaginary circle 13*v* inscribed in the inner peripheral surface of the first positioning hole 13 be smaller than the difference d2 between the maximum dimension S2 of the second portion 52 and the diameter R2 of the maximum imaginary circle 37*v* inscribed in the inner peripheral surface of the third positioning hole 37. In other words, d1<d2 is preferable. Note that the difference d1 is the value obtained by subtracting the maximum dimension S1 of the first portion 51 from the diameter R1 of the imaginary circle 13*v*, and the difference d2 is the value obtained by subtracting the maximum dimension S2 of the second portion 52 from the diameter R2 of the imaginary circle 37*v*.

Here, when the shaft 50 is circular in view in the −Z direction, the maximum dimensions S1 and S2 of the first portion 51 and the second portion 52 correspond to the diameter of the shaft 50. When the first positioning hole 13 and the third positioning hole 37 are circular in view in the −Z direction, the diameters R1 and R2 of the maximum imaginary circles 13*v* and 37*v* inscribed in the inner peripheral surfaces of the first positioning hole 13 and the third positioning hole 37 correspond to the inner diameters of the first positioning hole 13 and the third positioning hole 37. Since d1 is smaller than d2 as above, the distance that the print head 10 can move relative to the shafts 50 can be smaller than the distance that the electric member 30 can move relative to the shafts 50 in the XY plane, and thus, the accuracy in positioning the print head 10 in the XY plane relative to the shafts 50 can be higher than that of the electric member 30. Thus, the print head 10 can be positioned with relatively high accuracy relative to the support portion 40 to which the shafts 50 are fixed, and it is possible to reduce positional deviation in the landing positions of ink droplets ejected from the print head 10 onto the medium S. In other words, since the print head 10 includes the nozzles 11 configured to eject ink droplets, the print head 10 needs to be positioned relative to the support portion 40 with relatively high accuracy so as not to cause that positional deviation of the ink droplets ejected from the nozzles 11 when the ink droplets are landed on the medium. As described above, since the print head 10 is positioned relative to the support portion 40 with high accuracy, it is possible to improve the positioning accuracy between the plurality of print heads 10. In contrast, positioning in the XY plane of the electric member 30 relative to the print head 10 needs only to be to such a degree that the first electrically coupling portion 16 and the second electrically coupling portion 33 can be coupled. Hence, even if the accuracy in positioning the electric member 30 in the XY plane relative to the shafts 50, in other words, the accuracy in positioning the electric member 30 relative to the print head 10 is lower than the accuracy in positioning the print head 10 relative to the support portion 40, problems are less likely to occur in the coupling between the first electrically coupling portion 16 and the second electrically coupling portion 33.

It is preferable that the first portion 51 of the shaft 50 be press-fitted into the first positioning hole 13 of the print head 10. In other words, it is preferable that the diameter R1 of the imaginary circle 13*v* be smaller than or equal to the maximum dimension S1 of the first portion 51. If the first portions 51 are press-fitted into the first positioning holes 13 as above, the print head 10 cannot move relative to the shafts 50 in the XY plane, and this improves the accuracy in positioning the print head 10 in the XY plane relative to the shafts 50.

Note that it is preferable that the difference d2 be larger than 0 (zero). In other words, it is preferable that the diameter R2 of the imaginary circle 37*v* be larger than the maximum dimension S2 of the second portion 52. With this configuration, the second portions 52 will not form an interference fit with the third positioning holes 37 of the electric member 30, and it is easy to attach and detach the electric member 30 to and from the shafts 50. Specifically, the word “positioning” in the present disclosure includes a state in which the shafts 50 are press-fitted into the first positioning holes 13, the second positioning holes 23, and the third positioning holes 37, and thus, the print head 10, the flow path member 20, and the electric member 30 cannot move relative to the shafts 50 in the XY plane and also include a state in which the shafts 50 do not form interference fits with the first positioning holes 13, the second positioning holes 23, and the third positioning holes 37, and thus, the print head 10, the flow path member 20, and the electric member 30 can move a little relative to the shafts 50 in the XY plane, like in a case of a so-called rough locator.

It is also preferable that the relationship between the setting of the first portion 51 and the first positioning hole 13 and the setting of the third portion 53 and the second positioning hole 23 be the same as or similar to the relationship described above. Specifically, as illustrated in FIG. 15, in plan view in the Z-axis direction, it is preferable that the difference d1 between the maximum dimension S1 of the first portion 51 and the diameter R1 of the imaginary circle 13*v* be smaller than the difference d3 between the maximum dimension S3 of the third portion 53 and the diameter R3 of the maximum imaginary circle 23*v* inscribed in the inner peripheral surface of the second positioning hole 23. The difference d3 is the value obtained by subtracting the maximum dimension S3 of the third portion 53 from the diameter R3 of the imaginary circle 23*v*. In other words, d1<d3 is preferable. With this configuration, the accuracy in positioning the print head 10 relative to the shafts 50 can be higher than the accuracy in positioning the flow path member 20 relative to the shafts 50 in the XY plane. Since positioning the flow path member 20 in the XY plane relative to the print head 10 requires accuracy only to such a degree that the first flow-path coupling portions 15 and the second flow-path coupling portions 22 can be coupled, even if it is lower than the accuracy in positioning the print head 10 in the XY plane relative to the support portion 40, problems are less likely to occur.

It is preferable that the difference d3 be larger than 0 (zero), as with the difference d2. In other words, it is preferable that the diameter R3 of the imaginary circle 23*v* be larger than the maximum dimension S3 of the third portion 53. With this configuration, the third portions 53 will not form interference fits with the second positioning holes 23 of the flow path member 20, and it is easy to attach and detach the flow path member 20 to and from the shafts 50.

Figure 16:
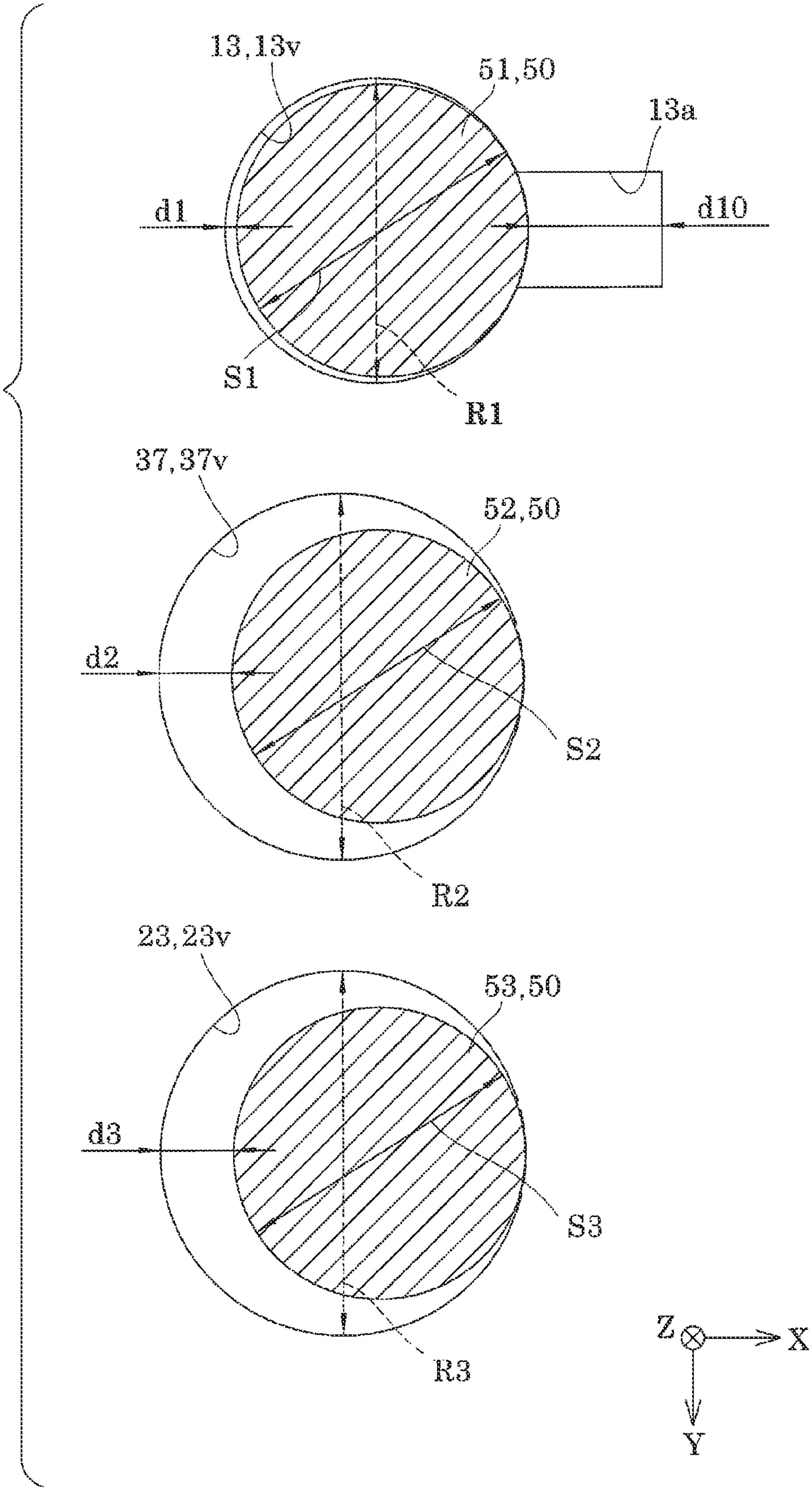
FIG. 16 illustrates cross-sectional views of important parts of a shaft and positioning holes in the liquid ejecting unit according to Embodiment 1.

For example, as illustrated in FIG. 16, when the first positioning hole 13 has a widened portion 13*a* formed by widening part of the first positioning hole 13, even if the maximum gap between the first positioning hole 13 and the first portion 51, in other words, the gap d10 between the first portion 51 and the widened portion 13*a* is larger than d1, d1 is defined by the diameter R1 of the maximum imaginary circle 13*v* inscribed in the inner peripheral surface of the first positioning hole 13. Thus, if d1<d2 and d1<d3 are satisfied, the accuracy in positioning the print head 10 in the XY plane relative to the shaft 50 can be higher than the accuracy of the electric member 30 and the flow path member 20. In other words, if the maximum gap is used for the definition, d10 is larger than d2 and d3. However, since the widened portion 13*a* does not affect positioning, the positioning accuracy of the first positioning hole 13 is actually higher than that of the second positioning hole 23 and the third positioning hole 37. Hence, it is possible to define which has better positioning accuracy, according to definition based on comparison of the difference d1 between the maximum dimension S1 of the first portion 51 of the shaft 50 and the diameter R1 of the maximum imaginary circle 13*v* inscribed in the inner peripheral surface of the first positioning hole 13, the difference d2 between the maximum dimension S2 of the second portion 52 of the shaft 50 and the diameter R2 of the maximum imaginary circle 23*v* inscribed the inner peripheral surface of the second positioning hole 23, and the difference d3 between the maximum dimension S3 of the third portion 53 of the shaft 50 and the diameter R3 of the maximum imaginary circle 37*v* inscribed in the inner peripheral surface of the third positioning hole 37.

Figure 17:
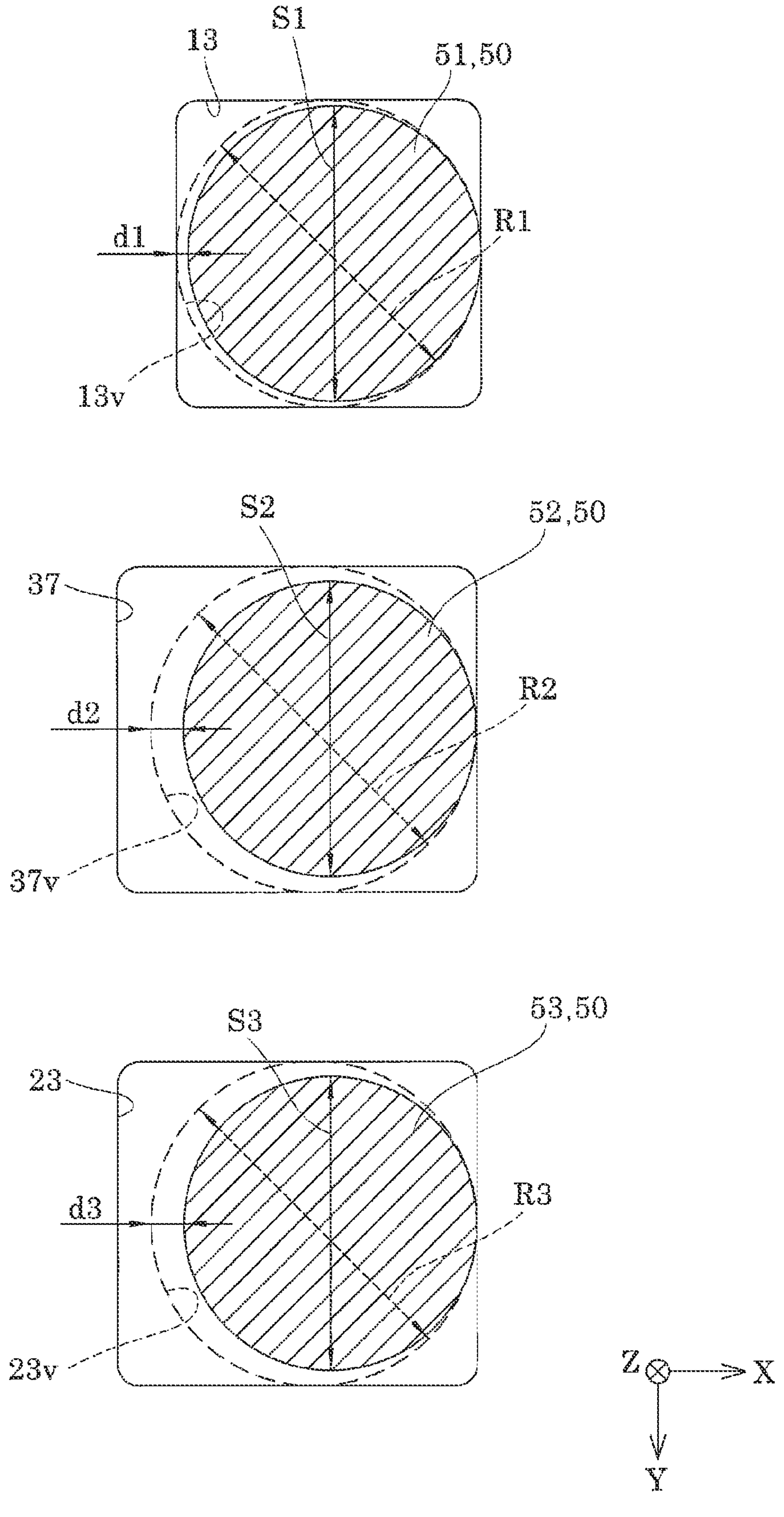
FIG. 17 illustrates cross-sectional views of important parts of a shaft and positioning holes in the liquid ejecting unit according to Embodiment 1.

Similarly, for example, even when the shape of the first positioning hole 13 viewed in the Z-axis direction is based on a rectangle and has curved surfaces at the corners as illustrated in FIG. 17, if d1<d2 and d1<d3 are satisfied, the accuracy in positioning the print head 10 in the XY plane relative to the shaft 50 can be higher than the positioning accuracy of the electric member 30 and the flow path member 20. Here, the difference d1 is defined by the diameter R1 of the maximum imaginary circle 13*v* inscribed in the inner peripheral surface of the first positioning hole 13 and the maximum dimension S1 of the first portion 51, the difference d2 by the diameter R2 of the maximum imaginary circle 37*v* inscribed in the inner peripheral surface of the third positioning hole 37 and the maximum dimension S2 of the second portion 52, and the difference d3 by the diameter R3 of the maximum imaginary circle 23*v* inscribed in the inner peripheral surface of the second positioning hole 23 and the maximum dimension S3 of the third portion 53.

Figure 18:
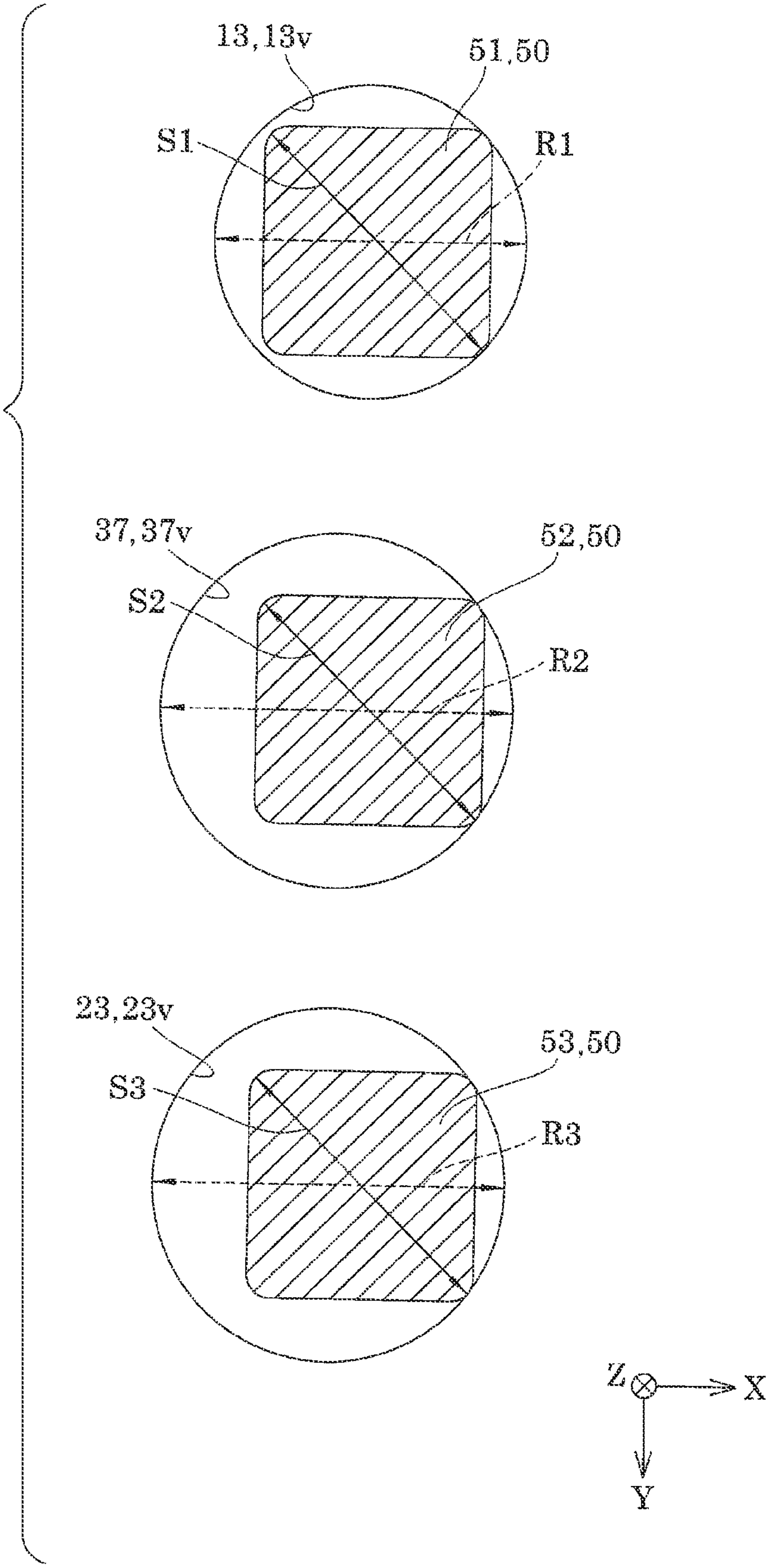
FIG. 18 illustrates cross-sectional views of important parts of a shaft and positioning holes in the liquid ejecting unit according to Embodiment 1.

Similarly, for example, as illustrated in FIG. 18, even when the cross-sectional shape of the shaft 50 perpendicular to the Z-axis is a shape based on a rectangle, the corners of which are filleted to have curved surfaces, if d1<d2 and d1<d3 are satisfied, the accuracy in positioning the print head 10 in the XY plane relative to the shaft 50 can be higher than the positioning accuracy of the electric member 30 and the flow path member 20. Here, the difference d1 is defined by the diameter R1 of the maximum imaginary circle 13*v* inscribed in the inner peripheral surface of the first positioning hole 13 and the maximum dimension S1 of the first portion 51, the difference d2 by the diameter R2 of the maximum imaginary circle 37*v* inscribed in the inner peripheral surface of the third positioning hole 37 and the maximum dimension S2 of the second portion 52, and the difference d3 by the diameter R3 of the maximum imaginary circle 23*v* inscribed in the inner peripheral surface of the second positioning hole 23 and the maximum dimension S3 of the third portion 53.

In the liquid ejecting unit 2 illustrated in FIGS. 15 to 18, in plan view in the −Z direction, it is preferable that the difference d1 between the maximum dimension S1 of the first portion 51 which is the portion of the shaft 50 inserted into the first positioning hole 13 and the diameter R1 of the maximum imaginary circle 13*v* inscribed in the inner peripheral edge of the first positioning hole 13 be smaller than the difference d2 between the maximum dimension S2 of the second portion 52 which is the portion of the shaft 50 inserted into the third positioning hole 37 and the diameter R2 of the maximum imaginary circle 37*v* inscribed in the inner peripheral edge of the third positioning hole 37.

Thus, the accuracy in positioning the print head 10 in the XY plane relative to the support portion 40 can be improved compared with the accuracy in positioning the electric member 30 relative to the print head 10. Thus, it is possible to reduce positional deviation in the landing positions of ink droplets ejected from the print head 10 onto the medium S. In addition, since the electric member 30 can be attached to or detached from the shafts 50 easily, it is easy to replace the print head 10 and the electric member 30.

In addition, it is preferable that the shafts 50 be inserted and press-fitted into the first positioning holes 13 to position the print head 10 relative to the support portion 40 and be inserted into the third positioning holes 37 to position the second electrically coupling portion 33 relative to the first electrically coupling portion 16. By press-fitting the shafts 50 into the first positioning holes 13 of the print head 10 to position the print head 10, it is possible to further improve the accuracy in positioning the print head 10 relative to the support portion 40.

The ink jet printing apparatus 1 of the present embodiment includes the liquid ejecting unit 2 described above and the liquid container 3 configured to store the liquid to be supplied to the liquid ejecting unit 2. Such an ink jet printing apparatus 1 can be downsized due to downsizing of the liquid ejecting unit 2, and it is possible to improve positioning accuracy of the print head 10, the flow path member 20, and the electric member 30 relative to the support portion 40 and to improve ease of the assembly.

Embodiment 2

Figure 19:
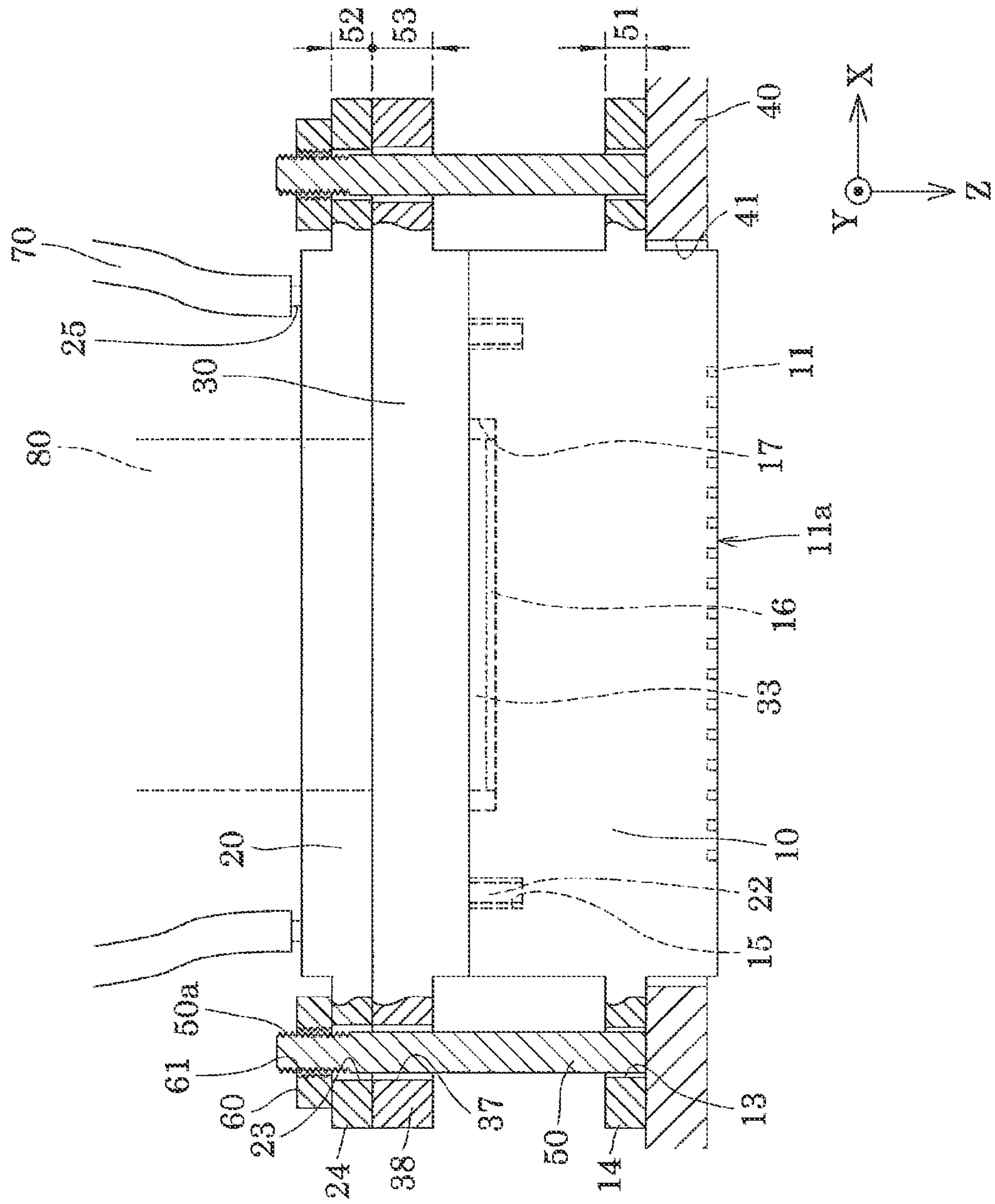
FIG. 19 is a cross-sectional view of an important part of a liquid ejecting unit according to Embodiment 2.
Figure 20:
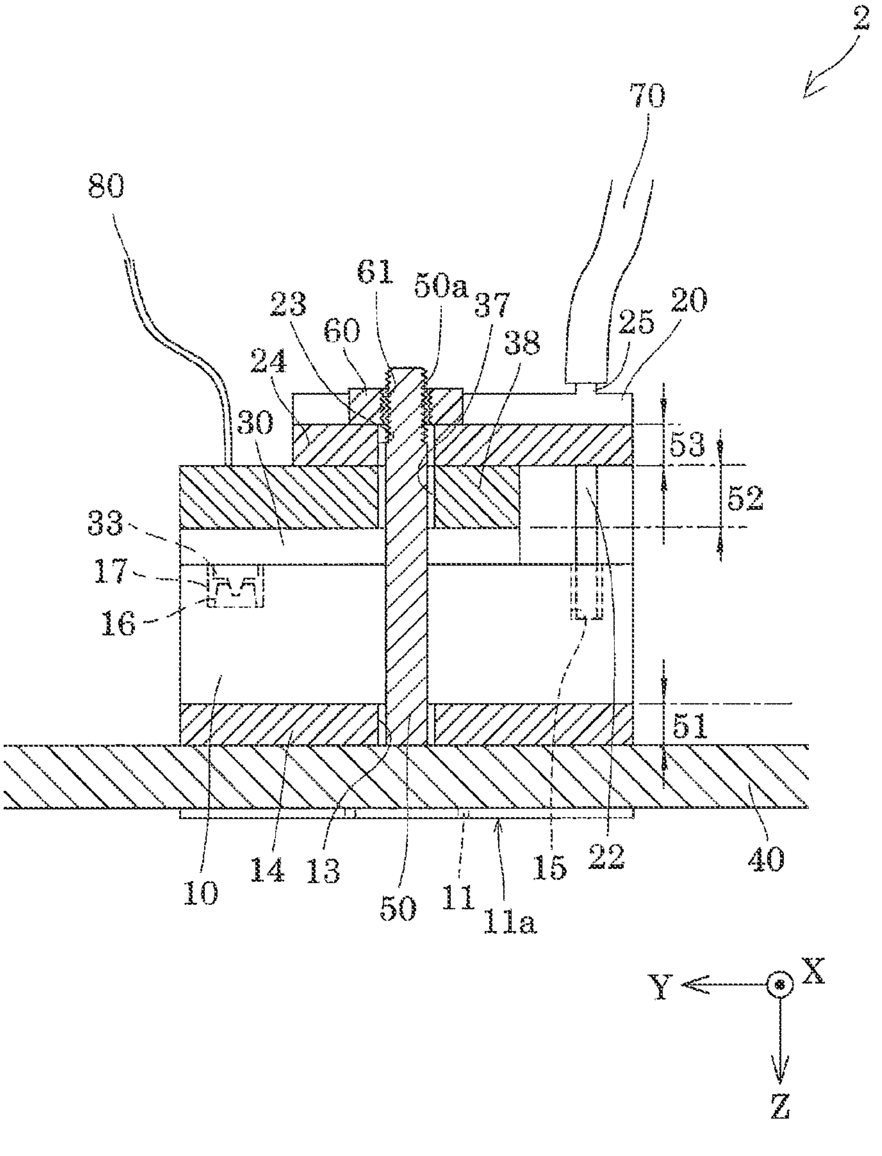
FIG. 20 is a cross-sectional view of an important part of the liquid ejecting unit according to Embodiment 2.

FIGS. 19 and 20 are cross-sectional views of important parts of a liquid ejecting unit according to Embodiment 2 of the present disclosure. The members the same as or similar to those in the foregoing embodiment are denoted by the same reference numerals, and repetitive description is omitted.

As illustrated in the figures, the liquid ejecting unit 2 of the present embodiment includes a print head 10, a flow path member 20, an electric member 30, a support portion 40, and shafts 50, and fixing members 60. The shafts 50 are inserted into first positioning holes 13 of the print head 10, third positioning holes 37 of the electric member 30, and second positioning holes 23 of the flow path member 20 in this order. In the present embodiment, the flow path member 20 corresponds to the first member, the second flow-path coupling portion 22 to the second coupling portion, and the second positioning hole 23 to the first through hole. The electric member 30 corresponds to the second member, the second electrically coupling portion 33 to the fourth coupling portion, and the third positioning hole 37 to the second through hole. The first flow-path coupling portion 15 of the print head 10 corresponds to the first coupling portion, and the first electrically coupling portion 16 to the third coupling portion.

Further, a second portion 52 of the shaft faces the second positioning hole 23 of the flow path member 20, and a third portion 53 faces the third positioning hole 37 of the electric member 30. The configuration as above of the present embodiment also provides effects the same as or similar to those of the foregoing Embodiment 1.

Embodiment 3

Figure 21:
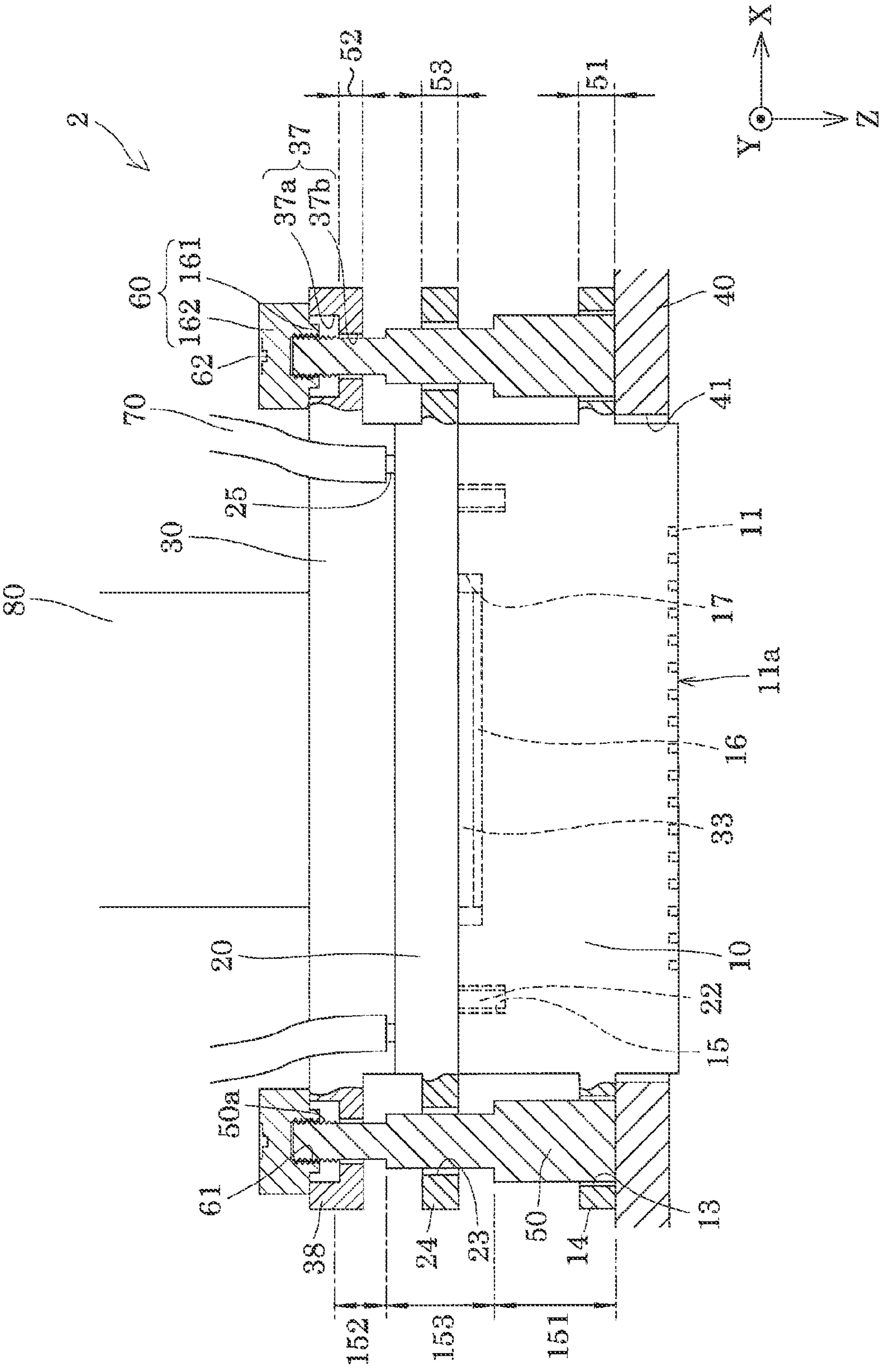
FIG. 21 is a cross-sectional view of an important part of a liquid ejecting unit according to Embodiment 3.

FIG. 21 is a cross-sectional view of an important part of a liquid ejecting unit according to Embodiment 3 of the present disclosure. The members the same as or similar to those in the foregoing embodiments are denoted by the same reference numerals, and repetitive description is omitted.

As illustrated in FIG. 21, in the present embodiment, the shafts 50 are inserted into the first positioning holes 13 of the print head 10, the second positioning holes 23 of the flow path member 20, and the third positioning holes 37 of the electric member 30 in this order as in the foregoing Embodiment 1. In the present embodiment, as in the foregoing Embodiment 1, the electric member 30 corresponds to the first member, and the flow path member 20 to the second member.

The shaft 50 has a first shaft portion 151 having a first portion 51, a second shaft portion 152 having a second portion 52, and a third shaft portion 153 having a third portion 53. The first shaft portion 151, the second shaft portion 152, and the third shaft portion 153 are coaxial and continuous.

The first portion 51 faces the first positioning hole 13 of the print head 10 in the state in which the print head 10 is fixed to the support portion 40. The second portion 52 is located between the first portion 51 and a thread groove 50*a* serving as an external screw and faces the third positioning hole 37 in the state in which the first electrically coupling portion 16 of the print head 10 and the second electrically coupling portion 33 of the electric member 30 are coupled. The third portion 53 is located between the first portion 51 and the second portion 52 and faces the second positioning hole 23 in the state in which the first flow-path coupling portions 15 of the print head 10 and the second flow-path coupling portions 22 of the flow path member 20 are coupled. Note that the state in which the shaft 50 faces the first positioning hole 13, the second positioning hole 23, and the third positioning hole 37 includes a state in which the outer peripheral surface of the shaft 50 is in contact with the inner peripheral surfaces of the first positioning hole 13, the second positioning hole 23, and the third positioning hole 37 and also includes a state in which there is no contact and there are gaps between the outer peripheral surface of the shaft 50 and the inner peripheral surfaces of these holes.

The first shaft portion 151 having the first portion 51 as above is longer than the first portion 51 in the Z-axis direction. Similarly, the second shaft portion 152 having the second portion 52 is longer than the second portion 52 in the Z-axis direction. Similarly, the third shaft portion 153 having the third portion 53 is longer than the third portion 53 in the Z-axis direction. The first shaft portion 151, the second shaft portion 152, and the third shaft portion 153 have the same cross-sectional shapes and the same cross-sectional areas in the Z-axis direction as the first portion 51, the second portion 52, and the third portion 53, respectively.

Then, regarding the cross section perpendicular to the Z-axis, in other words, the cross section parallel to the XY plane, the cross-sectional area of the second portion 52 is smaller than the cross-sectional area of the first portion 51. Here, the cross-sectional areas perpendicular to the Z-axis of the first portion 51 and the second portion 52 denote the maximum cross-sectional areas. In other words, the first portion 51 and the second portion 52 may have shapes in which the cross-sectional area varies in the Z-axis direction. For example, the first portion 51 and the second portion 52 may have tapered shapes in which the cross-sectional areas gradually increase toward the +Z direction. In the present embodiment, the cross sections perpendicular to the Z-axis of the first portion 51, the second portion 52 and the third portion 53 of the shaft 50 are circular. Hence, the diameter of the second portion 52 is smaller than the diameter of the first portion 51. However, the shape of the shaft 50 is not limited to this shape, and the cross section perpendicular to the Z-axis may have a polygonal shape, an elliptical shape, an oval shape, or the like. Alternatively, the first portion 51, the second portion 52, and the third portion 53 may have shapes different from one another, or two portions selected from the first portion 51, the second portion 52, and the third portion 53 may have the same shape.

Regarding the cross section perpendicular to the Z-axis, the cross-sectional area of the second portion 52 is smaller than the cross-sectional area of the third portion 53. Here, the cross-sectional areas perpendicular to the Z-axis of the second portion 52 and the third portion 53 denote the maximum cross-sectional areas. In other words, the second portion 52 and the third portion 53 may have different shapes in which the cross-sectional area varies in the Z-axis direction. In the present embodiment, since the cross section perpendicular to the Z-axis of the first portion 51, the second portion 52, and the third portion 53 of the shaft are circular, the diameter of the second portion 52 is smaller than the diameter of the third portion 53.

Specifically, the cross-sectional area perpendicular to the Z-axis reduces in the order of the first portion 51, the third portion 53, and the second portion 52.

The print head 10 has first positioning holes 13 corresponding to the head through holes, the flow path member 20 corresponding to the second member has second positioning holes 23 corresponding to the second through holes, and the electric member 30 corresponding to the first member has third positioning holes 37 corresponding to the first through holes. The third positioning hole 37 has a large-diameter portion 37*a* on the −Z direction side and a small-diameter portion 37*b* on the +Z direction side. The large-diameter portion 37*a* communicates with the small-diameter portion 37*b*. The cross-sectional area of the large-diameter portion 37*a* is larger than the cross-sectional area of the small-diameter portion 37*b* as viewed in the −Z direction. Hence, the small-diameter portion 37*b* of the third positioning hole 37 actually corresponds to the first through hole.

The fixing member 60 has a first fixing portion 161 and a second fixing portion 162. The first fixing portion 161 and the second fixing portion 162 are integrally formed, and the second fixing portion 162 is larger than the first fixing portion 161 and contains the first fixing portion 161 as viewed in the Z-axis direction. The first fixing portion 161 and the second fixing portion 162 have circular shapes as viewed in the Z-axis direction. Hence, the outer diameter of the second fixing portion 162 is larger than the outer diameter of the first fixing portion 161 as viewed in the Z-axis direction.

The fixing member 60 has a fixation hole 61 open toward the +Z direction, and a spiral thread groove is formed along the inner peripheral surface of the fixation hole 61. Thus, the fixing member 60 serves as an internal screw. The fixing member 60 serving as an internal screw is engaged with a thread groove 50*a* at the distal end portion of the shaft 50 serving as an external screw by thread engagement, so that the shaft 50 and the fixing member 60 are engaged. The fixation hole 61 of the present embodiment does not pass through the fixing member 60 in the Z-axis direction and is formed to a position halfway through the thickness in the Z-axis direction. Then, the −Z direction-facing surface of the fixing member 60 has a cross recess 62 having two orthogonal recesses, for example, a cross recess for screws specified in JIS B 1012:1985, which is a cross recess generally referred to as a plus. Since the −Z direction-facing surface of the fixing member 60 has the cross recess 62, it is possible to firmly fasten the fixing member 60 to the shaft 50 via the cross recess 62 by using a tool such as a screwdriver. Note that the recess formed in the −Z direction-facing surface of the fixing member 60 is not limited to a cross recess and may be, for example, a slot which is a letter I shaped recess generally referred to as a minus, a plus/minus recess in which one segment of the cross recess is elongated into the same shape as a slot, a hexagon socket which is a recess in the form of a hexagon, a square socket which is a recess in the form of a square, or the like.

In addition, the outer peripheral surface of the second fixing portion 162 of the fixing member 60 has fine irregularities, or a so-called knurled surface, to make the second fixing portion 162 less slippery when the second fixing portion 162 is held to rotate the fixing member 60.

When the fixing member 60 is engaged with the distal end portion of the shaft 50 by thread engagement, the +Z direction-facing surface of the second fixing portion 162 of the fixing member 60 comes into contact with the −Z direction-facing surface of the third flange portion 38, with the first fixing portion 161 of the fixing member 60 inserted in the large-diameter portion 37*a*. By fastening the fixing members 60 to the shafts 50 with the fixing members 60 in contact with the third flange portions 38 in the Z-axis direction, it is possible to hold the print head 10, the flow path member 20, and the electric member 30 between the fixing members 60 and the support portion 40 and to fix the print head 10, the flow path member 20, and the electric member 30 to the support portion 40.

Then, regarding the cross section perpendicular to the Z-axis, in other words, the cross section parallel to the XY plane, the cross-sectional area of the third positioning hole 37 is smaller than the cross-sectional area of the first portion 51. Here, the cross-sectional area of the third positioning hole 37 is the minimum cross-sectional area of the small-diameter portion 37*b* which is the portion other than the large-diameter portion 37*a* of the third positioning hole 37. This means that the third positioning hole 37 may have a shape in which the cross-sectional area varies in the Z-axis direction. Since the cross-sectional area of the third positioning hole 37 is smaller than the cross-sectional area of the first portion 51 as above, the first portions 51 cannot be inserted into the third positioning holes 37 of the electric member 30. Hence, even if the operator tries to insert the shafts 50 into the third positioning holes 37 of the electric member 30 before inserting the shafts 50 into the print head 10, the operator cannot insert the first portions 51 into the third positioning holes 37. Thus, it is possible to prevent the operator from making a mistake in the order of attaching the print head 10 and the electric member 30 to the shafts 50. Thus, it is possible to prevent the electric member 30 from being attached to the shafts 50 before the print head 10 is attached, so that it is possible to prevent the nozzle surface 11*a* of the print head 10 from coming into contact with the electric member 30 and being damaged.

Regarding the cross section perpendicular to the Z-axis, in other words, the cross section parallel to the XY plane, the cross-sectional area of the third positioning hole 37 of the electric member 30 is smaller than the cross-sectional area of the third portion 53. Here, the cross-sectional area of the third positioning hole 37 denotes the minimum cross-sectional area and thus, in the present embodiment, the cross-sectional area of the small-diameter portion 37*b*. Since the cross-sectional area of the third positioning hole 37 is smaller than the cross-sectional area of the third portion 53 as above, the third portion 53 of the shaft 50 cannot be inserted into the third positioning hole 37 of the electric member 30. Hence, even if the operator tries to insert the shafts 50 into the third positioning holes 37 of the electric member 30 before inserting the shafts 50 into the flow path member 20, the operator cannot insert the third portions 53 into the third positioning holes 37. Thus, it is possible to prevent the operator from making a mistake in the order of attaching the flow path member 20 and the electric member 30 to the shaft 50.

Figure 22:
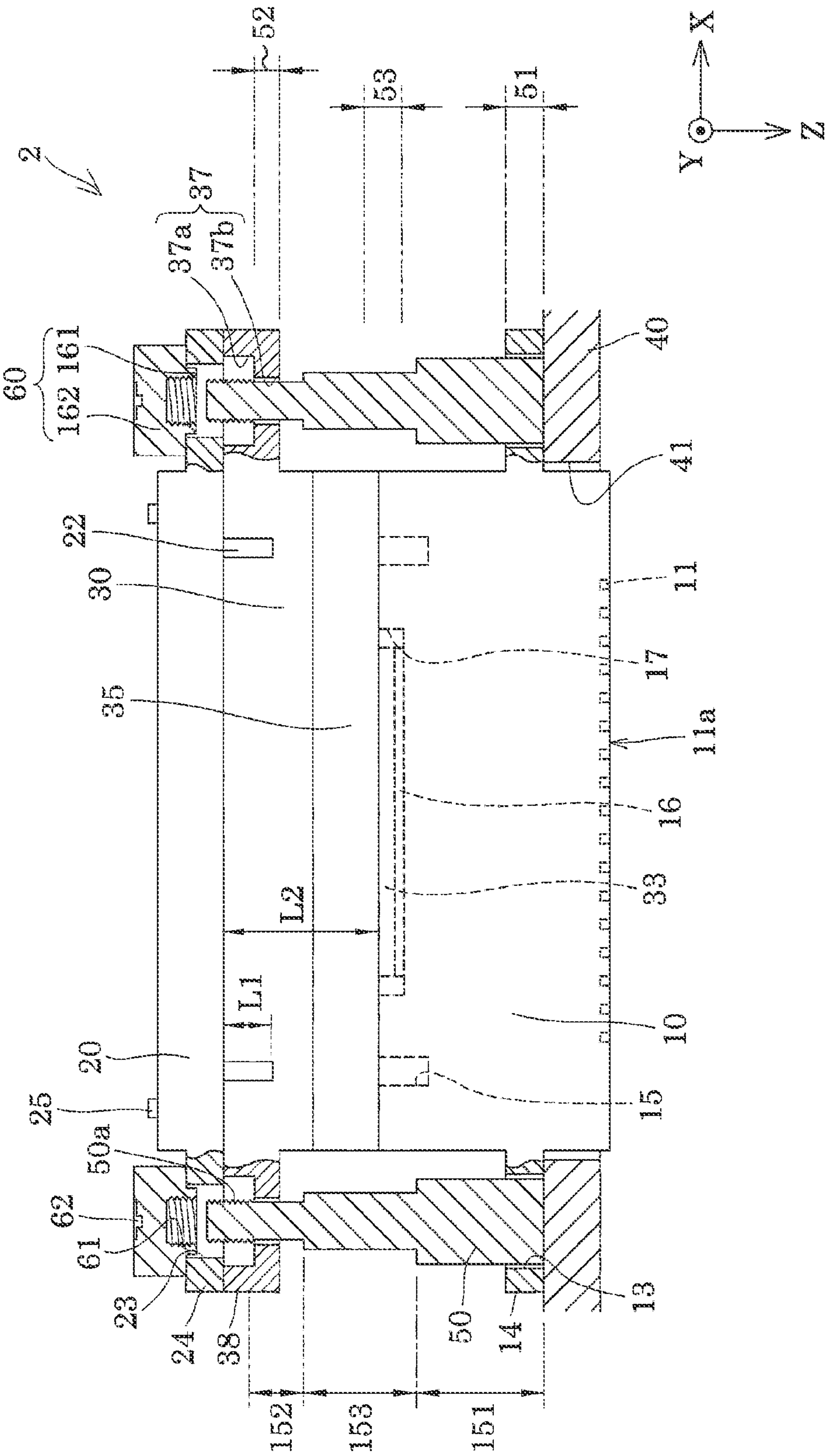
FIG. 22 is a cross-sectional view of an important part of the liquid ejecting unit according to Embodiment 3 which is wrongly assembled.
Figure 23:
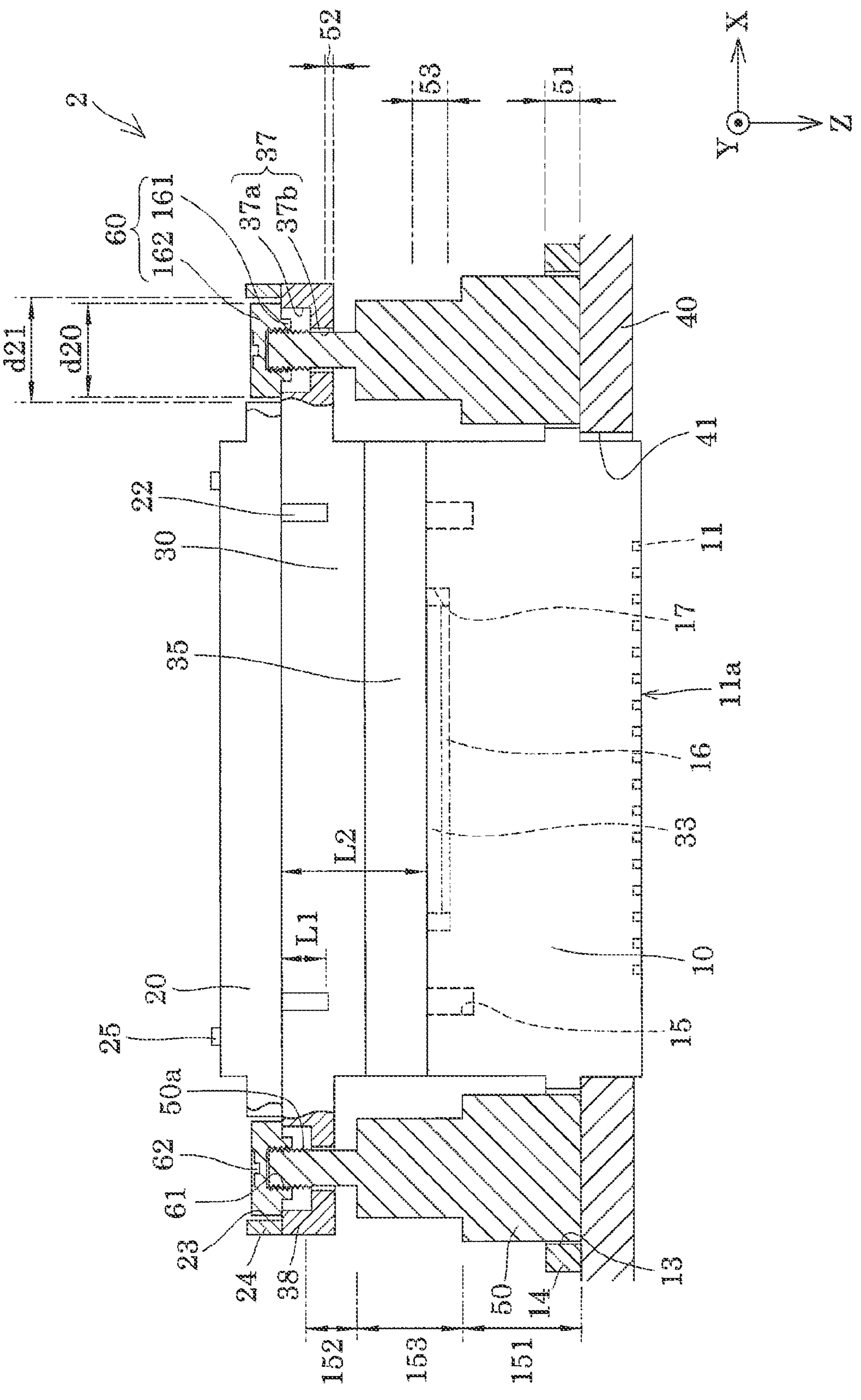
FIG. 23 is a cross-sectional view of an important part of a liquid ejecting unit according to a modification example of Embodiment 3 which is wrongly assembled.

Here, FIGS. 22 and 23 illustrate an example in which the print head 10 and the electric member 30 are stacked in a wrong order.

As illustrated in FIG. 22, the cross-sectional area of the fixing member 60 is larger than the cross-sectional area of the second positioning hole 23 of the flow path member 20 as viewed in the Z-axis direction. Here, the cross-sectional area of the fixing member 60 denotes the maximum cross-sectional area and thus, in the present embodiment, the cross-sectional area of the second fixing portion 162. The cross-sectional area of the second positioning hole 23 denotes the minimum cross-sectional area. For example, when the second fixing portion 162 and the second positioning hole 23 have circular shapes, the outer diameter of the second fixing portion 162 is larger than the inner diameter of the second positioning hole 23. With this configuration, the shafts 50 are inserted into the first positioning holes 13 of the print head 10, the third positioning holes 37 of the electric member 30, and the second positioning holes 23 of the flow path member 20 in this order. In this process, the first positioning holes 13 of the print head 10 are positioned by the first portions 51. The third positioning holes 37 of the electric member 30 are positioned by the second portions 52. Regarding the flow path member 20, since the second portions 52 are inserted into the second positioning holes 23, and there are large gaps between the second positioning holes 23 and the second portions 52, the positioning is not very accurate. The distal end portions of the shafts 50 do not protrude from the second positioning holes 23 in the −Z direction and are located within the second positioning holes 23. In the wrongly stacked state as described above, even if the operator tries to engage the internal screw of the fixation hole 61 of the fixing member 60 with the thread groove 50*a* of the shaft 50 by thread engagement, the fixing member 60 comes into contact with the second flange portion 24, and the movement of the fixing member 60 in the +Z direction is restricted. The internal screw of the fixation hole 61 of the fixing member 60 are away from the thread groove 50*a* of the shaft 50 in the Z-axis direction and will not engage the thread groove 50*a* of the shaft 50 by thread engagement. Hence, it is impossible to fix the print head 10, the flow path member 20, and the electric member 30 to the support portion 40 with the fixing members 60. With this situation, since the fixing members 60 fails thread engagement, the operator can notice that the order of stacking the print head 10, the flow path member 20, and the electric member 30 is wrong. Thus, it is possible to prevent the liquid ejecting unit 2 from being assembled in a wrong stacking order. Note that in the state in which the electric member 30 is coupled to the print head 10 with the first portions 51 of the shafts 50 inserted into the first positioning holes 13, the distal end portions of the shafts 50 protrude from the third positioning holes 37 in the −Z direction. Since the distal end portions of the shafts 50 protrude from the third positioning holes 37 in the −Z direction as above, it is easy to visually recognize the shafts 50, and it is possible to engage the fixing members 60 easily to the shafts 50 by thread engagement. Since the distal end portions of the shafts 50 protrude from the third positioning holes 37 in the −Z direction, when the order of stacking the flow path member 20 and the electric member 30 is wrong, the distal end portions of the shafts 50 protruding from the third positioning holes 37 in the −Z direction are located within the second positioning holes 23 and do not protrude from the second positioning holes 23 in the −Z direction. Thus, the operator can notice that the order of stacking the flow path member 20 and the electric member 30 is wrong by just checking whether the distal end portions of the shafts 50 protrude, and thus, it is possible to prevent the liquid ejecting unit 2 from being assembled in a wrong stacking order. However, a configuration is possible in which in the state in which the electric member 30 is coupled to the print head 10 with the first portions 51 of the shafts 50 inserted into the first positioning holes 13, the distal end portions of the shafts 50 do not protrude from the third positioning holes 37 in the −Z direction, in other words, the distal end portions of the shafts 50 are located within the third positioning holes 37.

As has been described above, in the liquid ejecting unit 2 of the present embodiment, the shaft 50 has the first portion 51 that faces the first positioning hole 13 in the state in which the print head 10 is supported by the support portion 40. The shaft 50 also has the second portion 52 located between the thread groove 50*a* and the first portion 51 and configured to face the third positioning hole 37 in the state in which the first electrically coupling portion 16 and the second electrically coupling portion 33 are coupled. The shaft 50 also has the third portion 53 located between the first portion 51 and the second portion 52 and configured to face the second positioning hole 23 in the state in which the first flow-path coupling portions 15 and the second flow-path coupling portions 22 are coupled. Then, regarding the cross section perpendicular to the −Z direction, it is preferable that the cross-sectional area of the second portion 52 be smaller than the cross-sectional area of the third portion 53, and regarding the cross section perpendicular to the −Z direction, it is preferable that the cross-sectional area of the third positioning hole 37, in the present embodiment, the cross-sectional area of the small-diameter portion 37*b*, be smaller than the cross-sectional area of the third portion 53. With this configuration, the third portions 53 will not be inserted into the third positioning holes 37, and it is more likely to notice that the order of assembling the flow path member 20 and the electric member 30 is wrong, making it possible to prevent assembling in a wrong stacking order.

Also in the present embodiment, as in the foregoing Embodiment 1, it is preferable that in plan view in the −Z direction, the difference d1 between the maximum dimension S1 of the first portion 51 which is inserted into the first positioning hole 13 of the shaft 50 and the diameter R1 of the maximum imaginary circle 13*v* inscribed in the inner peripheral surface of the first positioning hole 13 be smaller than the difference d2 between the maximum dimension S2 of the second portion 52 which is inserted into the third positioning hole 37 of the shaft 50 and the diameter R2 of the maximum imaginary circle 37*v* inscribed in the inner peripheral surface of the third positioning hole 37.

In addition, it is preferable that in plan view in the −Z direction, the difference d1 between the maximum dimension S1 of the first portion 51 which is inserted into the first positioning hole 13 of the shaft 50 and the diameter R1 of the maximum imaginary circle 13*v* inscribed in the inner peripheral surface of the first positioning hole 13 be smaller than the difference d3 between the maximum dimension S3 of the third portion 53 which is inserted into the third positioning hole 23 of the shaft 50 and the diameter R3 of the maximum imaginary circle 23*v* inscribed in the inner peripheral surface of the second positioning hole 23.

By setting the difference d1 between the first portion 51 and the first positioning hole 13, the difference d2 between the second portion 52 and the third positioning hole 37, and the difference d3 between the third portion 53 and the second positioning hole 23 to have the above relationship, it is possible to make the accuracy in positioning the print head 10 in the XY plane relative to the support portion 40 higher than the accuracy in positioning the flow path member 20 and the electric member 30 relative to the print head 10. Thus, it is possible to reduce positional deviation in the landing positions of ink droplets ejected from the print head 10 onto the medium S. In addition, since the flow path member 20 and the electric member 30 can be attached to or detached from the shaft 50 easily, it is easy to replace the print head 10, the flow path member 20, and the electric member 30.

In addition, it is preferable that the first portions 51 of the first shaft portions 151 be press-fitted into the first positioning holes 13 of the print head 10. In other words, it is preferable that the diameter R1 of the imaginary circle 13*v* be smaller than or equal to the maximum dimension S1 of the first portion 51. With this configuration, it is possible to further improve the accuracy in positioning the print head 10 in the XY plane relative to the shaft 50. In the present embodiment, the cross-sectional area perpendicular to the Z-axis decreases in the order of the first shaft portion 151 having the first portion 51, the third shaft portion 153 having the third portion 53, and the second shaft portion 152 having the second portion 52. With this configuration, even when the first portions 51 are press-fitted into the first positioning holes 13 of the print head 10, the second shaft portions 152 and the third shaft portions 153 do not form interference fits with the first positioning holes 13 when the second portions 52 and the third portions 53 are inserted into the first positioning holes 13. Hence, the distance in the Z-axis direction that the shafts 50 need to move with interference fits with the first positioning holes 13 of the print head 10 can be shorter than those in Embodiments 1 and 2, and this improves ease of assembly of the liquid ejecting unit 2. In addition, when the print head 10 is taken off the shafts 50, the distance that the print head 10 needs to move in the Z-axis direction to be released from the interference fits with the first shaft portions 151 can be short. Specifically, the first positioning holes 13 of the print head 10 do not form interference fits with the second shaft portions 152 and the third shaft portions 153. Thus, it is easy to take the print head 10 off the shafts 50, and replacement of the print head 10 is easy.

Note that it is preferable that the difference d2 at the second portion 52 of the shaft 50 be larger than 0 (zero). In other words, it is preferable that the diameter R2 of the imaginary circle 37*v* be larger than the maximum dimension S2 of the second portion 52. With this configuration, the second portions 52 will not form interference fits with the third positioning holes 37 of the electric member 30, and it is easy to attach and detach the electric member 30 to and from the shafts 50. However, a configuration in which the second portions 52 form interference fits with the third positioning holes 37 of the electric member 30 is possible.

In addition, the difference d3 at the third portion 53 of the shaft 50 be larger than 0 (zero). In other words, it is preferable that the diameter R3 of the imaginary circle 23*v* be larger than the maximum dimension S3 of the third portion 53. With this configuration, the third portions 53 will not form interference fits with the second positioning holes 23 of the flow path member 20, and it is easy to attach and detach the flow path member 20 to and from the shafts 50. However, a configuration in which the third portions 53 form interference fits with the second positioning holes 23 of the flow path member 20 is possible. In the present embodiment, since the cross-sectional area of the second portion 52 is smaller than that of the third portion 53 as viewed in the Z-axis direction, even when the third portions 53 form interference fits with the second positioning holes 23, the second portions 52 will not form interference fits with the second positioning holes 23. Thus, when the third portions 53 are press-fitted into the second positioning holes 23, the distance that the flow path member 20 needs to move in the Z-axis direction can be shorter than in the case of Embodiments 1 and 2. Also when the flow path member 20 is taken off, the distance that the flow path member 20 needs to move in the Z-axis direction to be released from the interference fits can be relatively short. Thus, in the present embodiment, even with the configuration in which the third portions 53 are press-fitted into the second positioning holes 23 of the flow path member 20, it is easy to attach and detach the flow path member 20 to and from the shafts 50.

In other words, in the liquid ejecting unit 2 of the present embodiment, the first portions 51 of the shafts 50 are press-fitted into the first positioning holes 13, so that the print head 10 is positioned relative to the support portion 40. In addition, the second portions 52 of the shafts 50 are press-fitted into the third positioning holes 37, so that the second electrically coupling portion 33 is positioned relative to the first electrically coupling portion 16. It is preferable that the third portions 53 of the shafts 50 be press-fitted into the second positioning holes 23, so that the second flow-path coupling portions 22 are positioned relative to the first flow-path coupling portions 15.

With this configuration, it is possible to improve the accuracy in positioning the print head 10 in the XY plane relative to the shafts 50. In addition, it is possible to improve the accuracy in positioning the flow path member 20 and the electric member 30 in the XY plane relative to the print head 10. In addition, even when the order of inserting the shafts 50 into the print head 10, the flow path member 20, and the electric member 30 is wrong, the distance that each member needs to move in the Z-axis direction in the state of interference fits with the shafts 50 is short, and when each member is pulled off shafts 50, the distance that each member needs to move to be released from the interference fits is short. Thus, reassembling is easy.

Note that as in the modification example of Embodiment 3 illustrated in FIG. 23, the outer shape of the second fixing portion 162 of the fixing member 60 may be smaller than the inner shape of the second positioning hole 23 of the flow path member 20, as viewed in the Z-axis direction. For example, when the second fixing portion 162 and the second positioning hole 23 have circular shapes, the outer diameter d20 of the second fixing portion 162 is smaller than the inner diameter d21 of the second positioning hole 23. Assume a case of assembling in a wrong order such that the shafts 50 are inserted into the third positioning holes 37 of the electric member 30 before the shafts 50 are inserted into the flow path member 20, and then the shafts 50 are inserted into the second positioning holes 23 of the flow path member 20, in other words, a case in which the shafts 50 are inserted into the first positioning holes 13 of the print head 10, the third positioning holes 37 of the electric member 30, the second positioning holes 23 of the flow path member 20 in this order. When assembling is performed in a wrong order as above, when the fixing member 60 is engaged with the shaft 50 by thread engagement, the fixing member 60 is inside the second positioning hole 23 of the flow path member 20 with gaps in between, as viewed in the Z-axis direction. Hence, there are gaps between the fixing member 60 and the second positioning hole 23. The flow path member 20 is not fixed by the fixing members 60, and the flow path member 20 is allowed to move by the gap relative to the shafts 50 in the XY plane. Hence, by only detecting the movement of the flow path member 20 relative to the shafts 50 in the XY plane, a so-called looseness, it is possible to notice that the order of stacking the print head 10, the flow path member 20, and the electric member 30 is wrong. Note that the outer shape of the second fixing portion 162 of the fixing member 60 is larger than that of the third positioning hole 37 as viewed in the Z-axis direction. With this configuration, in a right assembling process, the surfaces facing the +Z direction of the second fixing portions 162 come into contact with the surfaces facing the −Z direction of the third flange portions 38, and it is possible to fix the print head 10, the flow path member 20, and the electric member 30 to the support portion 40 by holding the print head 10, the flow path member 20, and the electric member 30 between the fixing members 60 and the support portion 40. In the state in which the electric member 30 is coupled to the print head 10 with the first portions 51 of the shafts 50 inserted into the first positioning holes 13, the distal end portions in the −Z direction of the shafts 50 protrude from the third positioning holes 37 in the −Z direction. Since the distal end portions of the shafts 50 protrude from the third positioning holes 37 in the −Z direction as above, it is easy to visually recognize the shafts 50, and thus, it is easy to engage the fixing members 60 to the shafts 50 by thread engagement. Since the distal end portions of the shafts 50 protrude from the third positioning holes 37 in the −Z direction, when the order of stacking the flow path member 20 and the electric member 30 is wrong, the distal end portions of the shafts 50 protruding from the third positioning holes 37 in the −Z direction are located within the second positioning holes 23 and do not protrude from the second positioning holes 23 in the −Z direction. Hence, by only checking whether the distal end portions of the shafts 50 protrude, it is possible to notice that the order of stacking the flow path member 20 and the electric member 30 is wrong, and thus, it is possible to prevent the liquid ejecting unit 2 being assembled in a wrong stacking order. However, a configuration is possible in which in the state in which the electric member 30 is coupled to the print head 10 with the first portions 51 of the shafts 50 inserted into the first positioning holes 13, the distal end portions of the shafts 50 do not protrude from the third positioning holes 37 in the −Z direction, in other words, the distal end portions of the shafts 50 are located within the third positioning holes 37.

As illustrated in FIG. 23, it is preferable that the length L1 in the Z-axis direction of the second flow-path coupling portions 22 of the flow path member 20 be such a length that the second flow-path coupling portions 22 are not coupled to the first flow-path coupling portions 15 of the print head 10 when the order of stacking the flow path member 20 and the electric member 30 is wrong. In other words, it is preferable that the length L1 of the second flow-path coupling portions 22 be shorter than the thickness L2 in the Z-axis direction of the electric member 30 held between the flow path member 20 and the print head 10. This configuration prevents the first flow-path coupling portion 15 and the second flow-path coupling portion 22 from being coupled when the stacking order is wrong. Thus, it is easy to move the flow path member 20 in the XY plane relative to the shafts 50, and this makes it more likely to notice that the stacking order is wrong. In other words, if the first flow-path coupling portion 15 and the second flow-path coupling portion 22 are coupled even in insufficient coupling, there is a possibility that a wrong assembly is not noticed. Note that Embodiment 3 (FIG. 22) has the same or a similar configuration.

OTHER EMBODIMENTS

Although embodiments of the present disclosure have been described, the basic configuration of the present disclosure is not limited to the foregoing ones.

Figure 24:
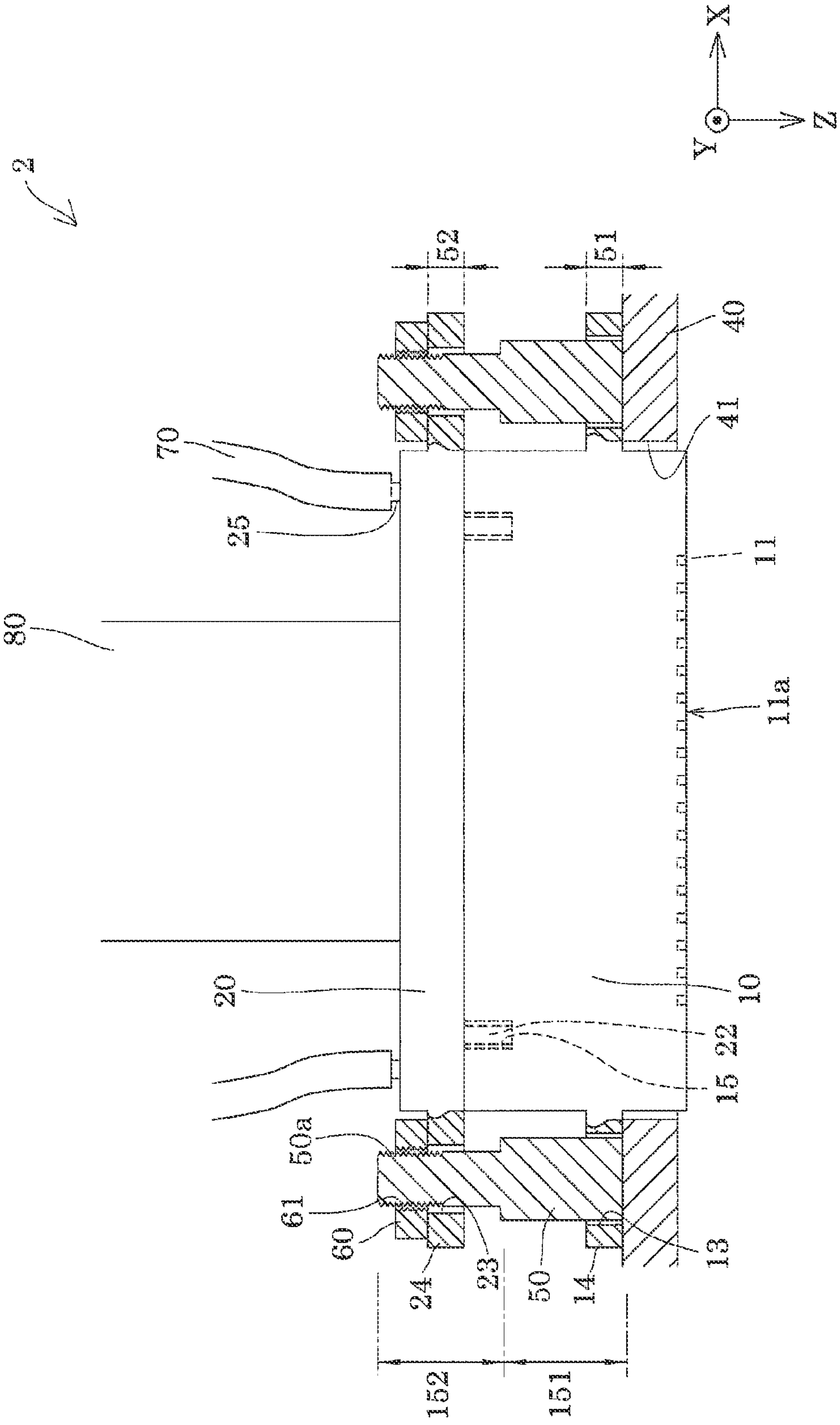
FIG. 24 is a cross-sectional view of an important part of a liquid ejecting unit according to another embodiment.

For example, although the liquid ejecting unit 2 includes the first member and the second member in the foregoing embodiments, the present disclosure is not particularly limited to this configuration. The liquid ejecting unit 2 may include only the first member. Here, FIG. 24 illustrates an example having a flow path member 20 as a first member. Note that FIG. 24 is a cross-sectional view of an important part of a modification example of Embodiment 1.

As illustrated in FIG. 24, a liquid ejecting unit 2 includes a support portion 40, shafts 50, a print head 10, and a flow path member 20. The shafts 50 are inserted into the first positioning holes 13 of the print head 10 and the second positioning holes 23 of the flow path member 20 in this order. In other words, in the example illustrated in FIG. 24, the second positioning hole 23 of the flow path member 20 correspond to the first through hole. Then, the distal end portion of the shaft 50 has a thread groove 50*a*, with which a thread groove formed in a fixation hole 61 of a fixing member 60 is engaged by thread engagement. With this configuration, the print head 10 and the flow path member 20 are held between the support portion 40 and the fixing members 60, and thus, the print head 10 and the flow path member 20 are fixed to the support portion 40. In this fixed state, first flow-path coupling portions 15 of the print head 10, which are the first coupling portions, are coupled in a liquid-tight manner to second flow-path coupling portions 22 of the flow path member 20 which are the second coupling portion. Note that the external wiring 80 is electrically coupled to the print head 10.

As in the foregoing Embodiment 3, the shaft 50 includes a first shaft portion 151 having a first portion 51 and a second shaft portion 152 having a second portion 52. Regarding the cross section perpendicular to the Z-axis, the cross-sectional area of the second portion 52 is smaller than the cross-sectional area of the first portion 51. Here, the cross-sectional areas of the first and second portions 51 and 52 denote their maximum cross-sectional areas. Regarding the cross section perpendicular to the Z-axis, the cross-sectional area of the second positioning hole 23 is smaller than the cross-sectional area of the first portion 51. Here, the cross-sectional area of the second positioning hole 23 denotes its minimum cross-sectional area. Since the cross-sectional area of the second portion 52 is smaller than the cross-sectional area of the first portion 51, and the cross-sectional area of the second positioning hole 23 is smaller than the cross-sectional area of the first portion 51, as described above, it is possible to prevent the shafts 50 from being wrongly inserted into the second positioning holes 23 and the first positioning holes 13 in this order. Thus, it is possible to prevent the nozzle surface 11*a* from coming into contact with the flow path member 20 and being damaged due to wrong assembling in which the print head 10 is attached to the shafts 50 after the flow path member 20 is attached.

As has been described above, the liquid ejecting unit 2 illustrated in FIG. 24 includes the print head 10 having the first flow-path coupling portions 15 and configured to eject liquid and the flow path member 20 having the second flow-path coupling portions 22 configured to couple the first flow-path coupling portions 15. The liquid ejecting unit 2 includes the support portion 40 for supporting the print head 10, the shafts 50 protruding from the support portion 40 in the −Z direction, and the fixing members 60. The print head 10 has the first positioning holes 13, and the flow path member 20 has the second positioning holes 23. In the state in which the shafts 50 are inserted into the first positioning holes 13 and the second positioning holes 23 in this order, the shafts 50 and the fixing members 60 are engaged, and this engagement fixes the print head 10 and the flow path member 20 to the support portion 40.

Since by only fixing the fixing members 60 to the shafts 50, the print head 10 can be fixed to the support portion 40, and the flow path member 20 can be fixed to the print head 10 as described above. Thus, it is possible to replace the print head 10 and the flow path member 20 easily by only disengaging the fixing members 60 from the shafts 50. In addition, since the print head 10 can be positioned relative to the support portion 40, and the flow path member 20 can be positioned relative to the print head 10, by only inserting the common shafts 50 into the first positioning holes 13 and the second positioning holes 23, the positioning process is simpler than a configuration in which the print head 10 and the flow path member 20 are fixed to different shafts 50. In addition, since the print head 10 and the flow path member 20 can be fixed with the common shafts 50, it is possible to make the sizes of the print head 10 and the flow path member 20 in the XY plane smaller than a configuration individually including mechanisms for positioning and fixing the print head 10 and the flow path member 20. In particular, in a configuration in which the support portion 40 supports a plurality of print heads 10, it is possible to reduce the interval between the plurality of print heads 10, and this enables downsizing of the liquid ejecting unit 2. In addition, since the print head 10 and the flow path member 20 can be fixed to the support portion 40 by only engaging the fixing members 60 with the shafts 50, such a task is easy in the configuration in which the support portion 40 supports the plurality of print heads 10 as in the present embodiment, and this improves ease of assembly of the liquid ejecting unit 2.

Note that FIG. 24 illustrates a configuration example having the flow path member 20 as the first member, the present disclosure is not particularly limited to this configuration. A configuration including the electric member 30 as the first member as in Embodiment 1 and not including the flow path member 20 which is the second member is possible.

In the liquid ejecting unit 2 illustrated in FIG. 24, the shaft 50 has the thread groove 50*a*, and in the state in which the shafts 50 are inserted into the first positioning holes 13 and the second positioning holes 23, the fixing members 60 are engaged with the thread grooves 50*a* by thread engagement. With this configuration, the print head 10 and the flow path member 20 are held between the fixing members 60 and the support portion 40, so that the print head 10 and the flow path member 20 are fixed to the support portion 40.

The shafts 50 and the fixing members 60 can be engaged by thread engagement between the shafts 50 and the fixing members 60, and by only fastening the fixing members 60 to the shafts 50, the print head 10 and the flow path member 20 can be reliably fixed between the fixing members 60 and the support portion 40.

In the liquid ejecting unit 2 illustrated in FIG. 24, the shaft 50 has the first portion 51 configured to face the first positioning hole 13 in the state in which the print head 10 is supported by the support portion 40. The shaft 50 also has the second portion 52 located between the thread groove 50*a* and the first portion 51 and configured to face the second positioning hole 23 in the state in which the first flow-path coupling portions 15 are coupled to the second flow-path coupling portions 22. Then, regarding the cross section of the shaft 50 perpendicular to the −Z direction, the cross-sectional area of the second portion 52 is smaller than the cross-sectional area of the first portion 51, and regarding the cross section perpendicular to the −Z direction, the cross-sectional area of the second positioning hole 23 is smaller than the cross-sectional area of the first portion 51. With this configuration, when the shafts 50 are wrongly inserted into the second positioning holes 23 of the flow path member 20 before the shafts 50 are inserted into the first positioning holes 13 of the print head 10, the second positioning holes 23 of the flow path member 20 will not move to the position facing the first portion 51, it is possible to notice wrong assembling. Thus, it is possible to prevent the nozzle surface 11*a* of the print head 10 from coming into contact with the flow path member 20 and being damaged due to wrong assembling.

Although in the example illustrated in FIG. 24, the first portion 51 and the second portion 52 of the shaft 50 have different cross-sectional areas perpendicular to the Z-axis, the present disclosure is not particularly limited to this configuration. The first portion 51 and the second portion 52 of the shaft 50 may have the same cross-sectional area as in the foregoing Embodiment 1.

Figure 25:
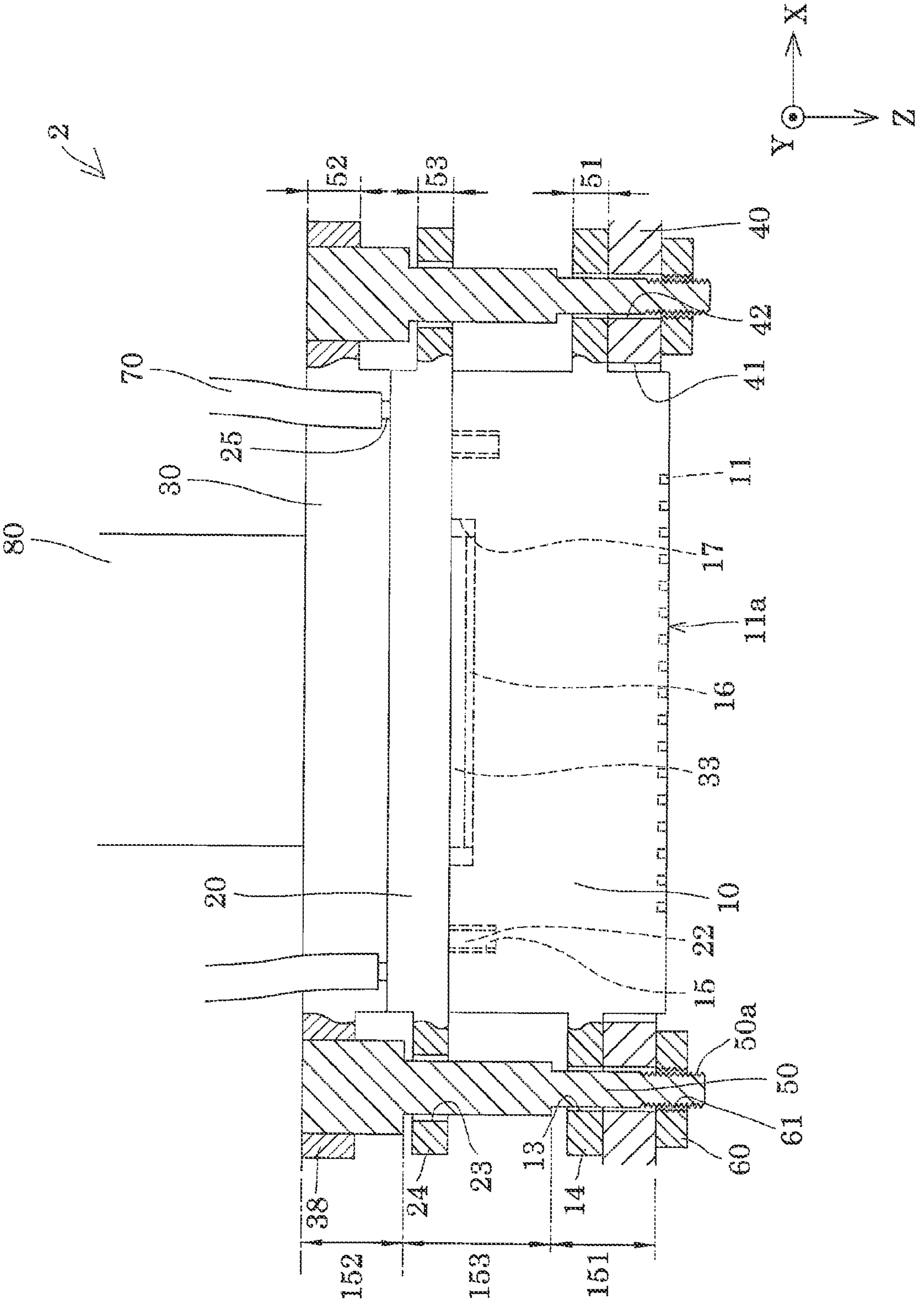
FIG. 25 is a cross-sectional view of an important part of a liquid ejecting unit according to another embodiment.

FIG. 25 illustrates a modification example of the liquid ejecting unit 2. FIG. 25 is a cross-sectional view of an important part of a modification example of the liquid ejecting unit 2.

As illustrated in FIG. 25, a support portion 40 has shaft through holes 42 passing through the support portion 40 in the Z-axis direction. Shafts 50 of the present modification example are parts of an electric member 30, unlike those in the foregoing embodiments. In other words, the electric member 30 and the shafts 50 have an integrated structure. The electric member 30 is an example of the first member, and a flow path member 20 is an example of the second member. Here, the configuration in which the electric member 30 and the shafts 50 have an integrated structure includes a configuration in which the shafts 50 and the electric member 30 are manufactured in the same manufacturing process by injection molding or casting. The configuration in which the electric member 30 and the shafts 50 have an integrated structure also includes a configuration in which the shafts 50 are press-fitted into holes formed in the electric member 30 so as not to be easily detached. The configuration in which the electric member 30 and the shafts 50 have an integrated structure also includes a configuration in which the shafts 50 are welded and fixed to the electric member 30 so as not to be easily detached.

The shafts 50 protrude in the +Z direction from the +Z direction-facing surface of the third flange portions 38 of the electric member 30. The shaft 50 includes a first shaft portion 151 having a first portion 51, a second shaft portion 152 having a second portion 52, and a third shaft portion 153 having a third portion 53. The first shaft portion 151, the third shaft portion 153, and the second shaft portion 152 are located in this order in the −Z direction. Regarding the size of the cross-sectional area orthogonal to the Z-axis direction, the first portion 51 is smallest, the third portion 53 is larger than the first portion 51, and the second portion 52 is larger than the third portion 53.

The distal end portion of the shaft 50 in the +Z direction has a thread groove 50*a* on its outer peripheral surface and serves as an external screw. In the state in which the shafts 50 are inserted into the second positioning holes 23 of the flow path member 20 and the first positioning holes 13 of the print head 10 in this order, the distal end portions of the shafts 50 with the thread grooves 50*a* are inserted in the +Z direction into shaft through holes 42 of the support portion 40. Then, the fixing members 60 are engaged with the distal end portions of the shafts 50 by thread engagement on the +Z direction-facing surface of the support portion 40, so that the print head 10 and the flow path member 20 are held between the support portion 40 and the third flange portions 38, and thus, the print head 10, the flow path member 20, and the electric member 30 are positioned and fixed to the support portion 40. Specifically, in the liquid ejecting unit 2 illustrated in FIG. 25, for example, in the state in which the print head 10, the flow path member 20, and the electric member 30 are temporarily assembled with the shafts 50, the distal end portions of the shafts 50 protrude from the nozzle surface 11*a* in the +Z direction. Thus, when the distal end portions of the shafts 50 of the temporary assembly are inserted into the shaft through holes 42 of the support portion 40, it is possible to prevent the nozzle surface 11*a* from coming into contact with the −Z direction-facing surface of the support portion 40 and being damaged.

Note that the configuration as above illustrated in FIG. 25 may have a flow path member 20 as the first member and an electric member 30 as the second member.

Figure 26:
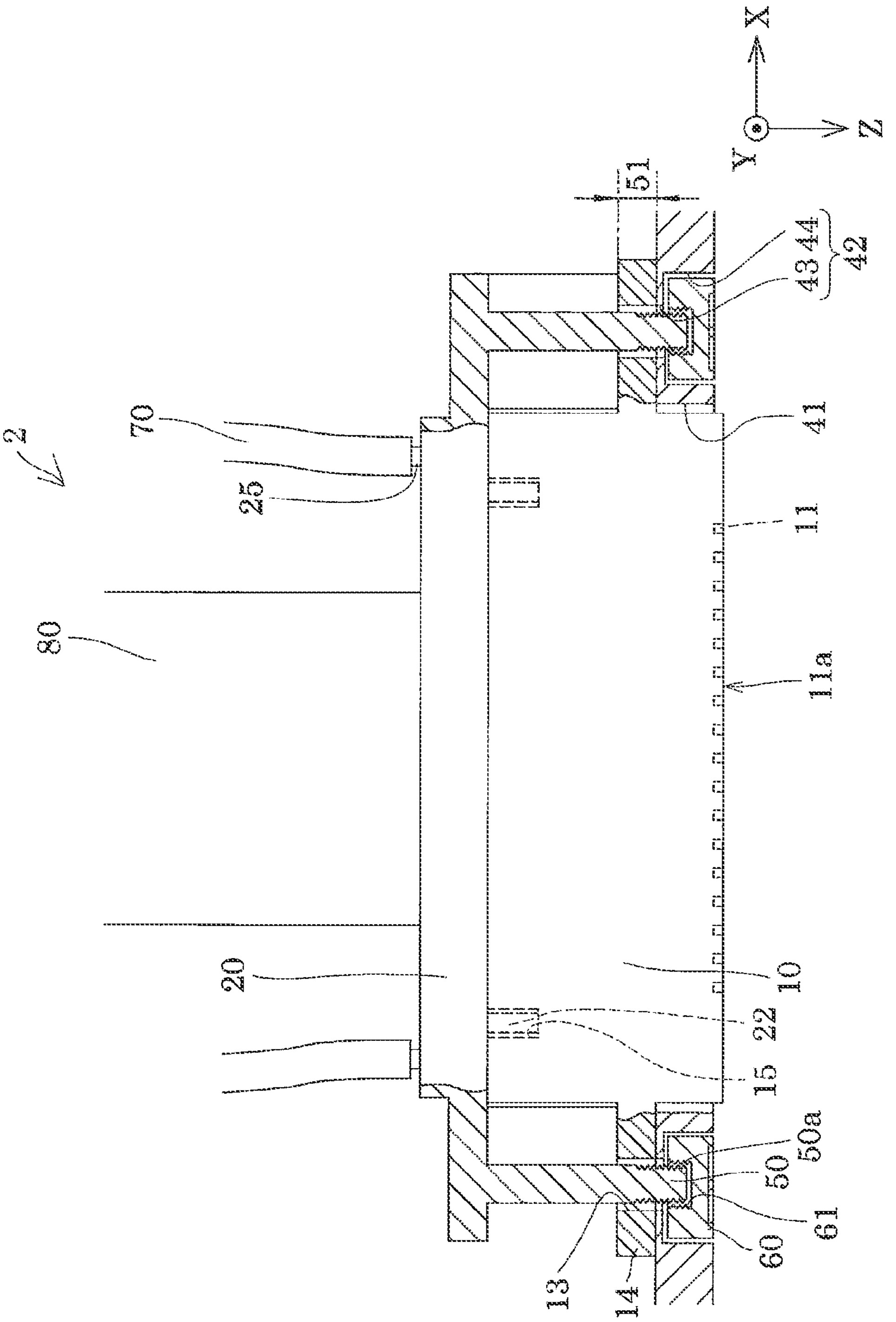
FIG. 26 is a cross-sectional view of an important part of a liquid ejecting unit according to another embodiment.

The configuration as above illustrated in FIG. 25 may have a flow path member 20 or an electric member 30 as the first member without having a second member. Here, FIG. 26 illustrates a configuration not having an electric member 30 and having shafts 50 and a flow path member 20 that have an integrated structure. FIG. 26 is a cross-sectional view of an important part of a modification example of the liquid ejecting unit 2.

As illustrated in FIG. 26, the flow path member 20 has an integrated structure with the shafts 50 protruding in the +Z direction. Here, an integrated structure denotes the same or similar meaning as or to the relationship between the shafts 50 and the electric member 30 described above.

The support portion 40 has shaft through holes 42 passing through the support portion 40 in the Z-axis direction. The shaft through hole 42 has a first shaft through hole 43 and a second shaft through hole 44. The first shaft through hole 43 is open to the −Z direction-facing surface of the support portion 40, and the second shaft through hole 44 is open to the +Z direction-facing surface of the support portion 40. Regarding the area of the opening perpendicular to the Z-axis, the area of the opening of the second shaft through hole 44 is larger than the area of the opening of the first shaft through hole 43. In plan view in the −Z direction, the size of the opening of the first shaft through hole 43 is smaller than the maximum cross-sectional area of the fixing member 60, and the size of the opening of the second shaft through hole 44 is larger than the maximum cross-sectional area of the fixing member 60. The depth in the Z-axis direction of the second shaft through hole 44 is larger than or equal to the thickness in the Z-axis direction of the fixing member 60.

The shaft 50 has such a length that when the flow path member 20 and the print head 10 are temporarily assembled, the distal end portions of the shafts 50 are inserted into the shaft through holes 42, and the first flange portions 14 of the print head 10 come into contact with the −Z direction-facing surface of the support portion 40, the distal end portions of the shafts 50 do not protrude from the +Z direction-facing surface of the support portion 40 and are located within the second shaft through holes 44. With this configuration, when the fixing members 60 are engaged with the shafts 50 by thread engagement in the state in which the shafts 50 are inserted into the shaft through holes 42, the fixing members 60 move into the second shaft through holes 44 and do not protrude from the +Z direction-facing surface of the support portion 40. This configuration prevents the fixing members 60 and the shafts 50 from protruding from the nozzle surface 11*a* toward the medium on the nozzle surface 11*a* side of the print head 10. Thus, it is possible to reduce the distance between the nozzle surface 11*a* of the print head 10 and the medium, and it is also possible to prevent the medium from being caught by the fixing members 60 or the shafts 50, causing paper jams and deformation of the fixing members 60 or the shafts 50. Note that since hexagon nuts are not suitable for the fixing members 60 as above which are inserted into the second shaft through hole 44, it is preferable to use fixing members 60 having a cross recess or the like on the surface facing the +Z direction as in Embodiment 3. Alternatively, the shafts 50 may be press-fitted into the first shaft through holes 43. In this case, since the shaft through hole 42 has the second shaft through hole 44, the distance in the Z-axis direction that the shaft 50 needs to move to be press-fitted into the first shaft through hole 43 is short, and this makes replacement easy. Note that the external wiring 80 is electrically coupled to the print head 10. Although the present embodiment illustrates a configuration example having the flow path member 20 as the first member, the present disclosure is not particularly limited to this configuration. A configuration having an electric member 30 as the first member is possible.

As has been described above, the liquid ejecting unit 2 illustrated in FIG. 26 includes the print head 10 having the first flow-path coupling portion 15, which is the first coupling portion, and configured to eject liquid. The liquid ejecting unit 2 also includes the flow path member 20 having the second flow-path coupling portion 22 which is the second coupling portion configured to couple the first flow-path coupling portion 15. The liquid ejecting unit 2 includes the support portion 40 for supporting the print head 10 and the fixing members 60. The flow path member 20 has the shafts 50 protruding in the +Z direction which is the protruding direction, the print head 10 has the first positioning holes 13 which are the head through holes, and the support portion 40 has the shaft through holes 42. The shaft 50 has the thread groove **50*a* at the end portion in the +Z direction. The fixing members 60 are engaged with the thread grooves 50*a* by thread engagement in the state in which the shafts 50 are inserted into the shaft through holes 42 and the first positioning holes 13, and the print head 10 and the flow path member 20 are thus fixed to the support portion 40**. This configuration as above also provides effects the same as or similar to those in the foregoing embodiments.

Figure 27:
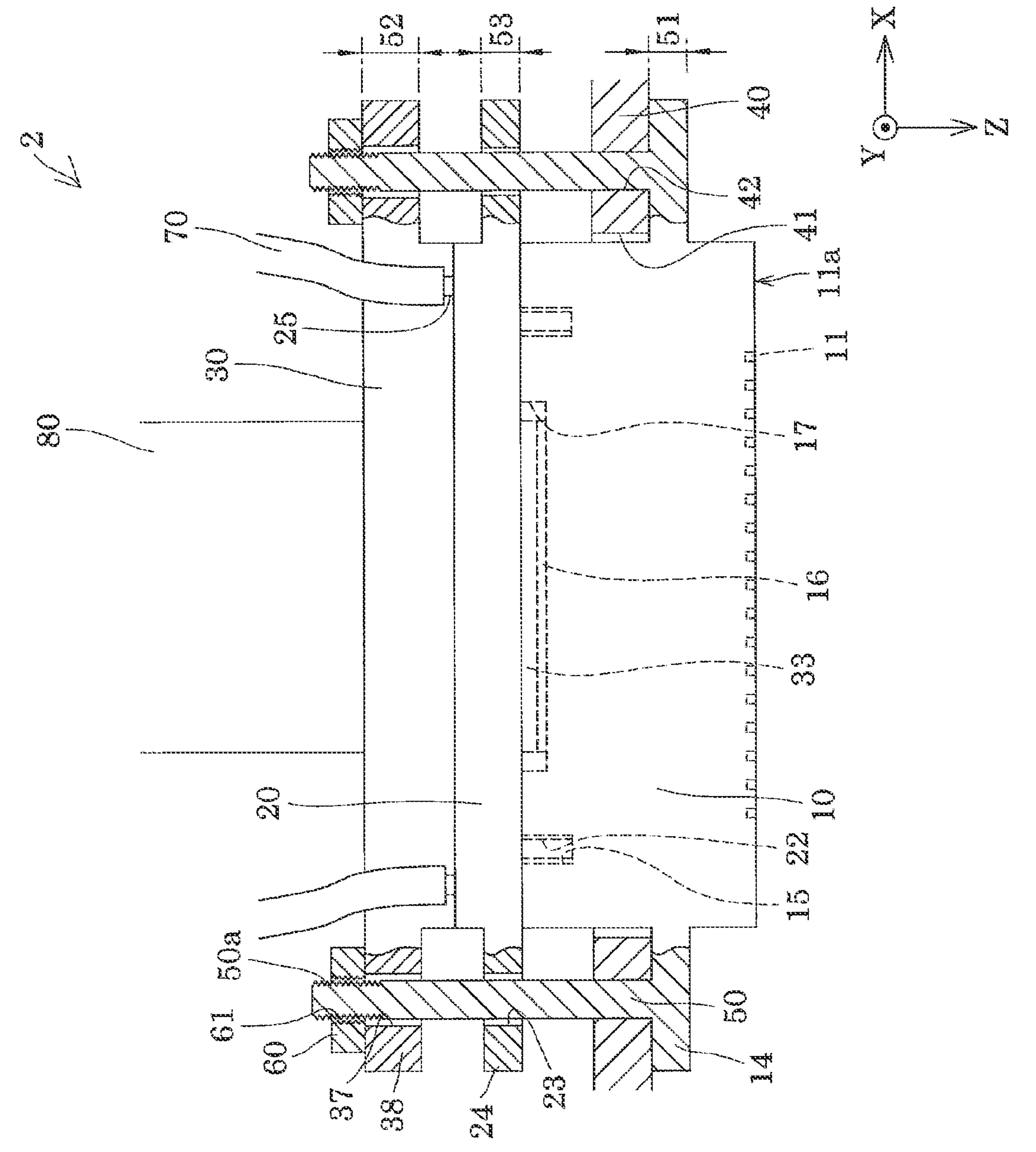
FIG. 27 is a cross-sectional view of an important part of a liquid ejecting unit according to another embodiment.

The shafts 50 and the print head 10 may have an integrated structure. FIG. 27 illustrates such an example. FIG. 27 is a cross-sectional view of an important part of a modification example of the liquid ejecting unit 2.

As illustrated in FIG. 27, first flange portions 14 of a print head 10 have shafts 50 protruding in the −Z direction, which is the protruding direction, and the print head 10 and the shafts 50 have an integrated structure. Here, an integrated structure denotes the same or similar meaning as or to the relationship between the shafts 50 and the electric member 30 described above.

The support portion 40 has shaft through holes 42 that pass through the support portion 40 in the Z-axis direction and into which the shafts 50 are inserted. The shafts 50 are press-fitted into the shaft through holes 42. With this configuration, the shafts 50 of the print head 10 are press-fitted into the shaft through holes 42 from the +Z direction side of the support portion 40, so that the print head 10 is positioned relative to the support portion 40. Then, the shafts 50 protruding in the −Z direction from the support portion 40 are inserted into the second positioning holes 23 of the flow path member 20 and the third positioning holes 37 of the electric member 30 in this order. Then, the fixing members 60 are engaged with the distal end portions in the −Z direction of the shafts 50. With this process, the print head 10 is fixed to the +Z direction-facing surface of the support portion 40, and the flow path member 20 and the electric member 30 are fixed to the support portion 40 by being held between the support portion 40 and the fixing member 60. In the present modification example, since the shafts 50 of the print head 10 are press-fitted into the shaft through holes 42, the print head 10 is prevented from falling from the support portion 40 in the +Z direction and can be held by the support portion 40, and this improves the workability.

Specifically, in the configuration illustrated in FIG. 27, the electric member 30 corresponds to the first member, and the third positioning hole 37 corresponds to the first through hole. The flow path member 20 corresponds to the second member, and the second positioning hole 23 corresponds to the second through hole.

Although in the configuration illustrated in FIG. 27, the electric member 30 corresponds to the first member, the present disclosure is not particularly limited to this configuration. A configuration as illustrated in FIG. 19 in which the flow path member 20 is the first member, and the electric member 30 is the second member is possible. However, a configuration not having the flow path member 20 and having only the electric member 30 is possible, and a configuration not having the electric member 30 and having only the flow path member 20 is also possible.

As has been described above, the liquid ejecting unit 2 illustrated in FIG. 27 has the print head 10 having the first electrically coupling portion 16, which is the first coupling portion, and configured to eject liquid. The liquid ejecting unit 2 also has the electric member 30 having the second electrically coupling portion 33 which is the second coupling portion configured to couple the first electrically coupling portion 16. The liquid ejecting unit 2 has the support portion 40 for supporting the print head 10 and the fixing members 60. The print head 10 has the shafts 50 protruding in the −Z direction, and the electric member 30 has the third positioning holes 37. The support portion 40 has the shaft through holes 42, and the shaft 50 has the thread groove **50*a* at the end portion in the −Z direction. The shafts 50 are press-fitted into the shaft through holes 42, and the fixing members 60 are engaged with the thread grooves 50*a* by thread engagement in the state in which the shafts 50 are inserted into the third positioning holes 37 and the shaft through holes 42, so that the print head 10 and the electric member 30 are fixed to the support portion 40**. This configuration as above also provides effects the same as or similar to those in the foregoing Embodiment 1.

In the liquid ejecting unit 2 illustrated in FIG. 27, the print head 10 has the first flow-path coupling portions 15 which are the third coupling portions, and the flow path member 20 has the second flow-path coupling portions 22 which are the fourth coupling portions configured to couple the first flow-path coupling portions 15. The flow path member 20 has the second positioning holes 23. Then, the fixing members 60 are engaged with the thread grooves **50*a* by thread engagement in the state in which the shafts 50 are inserted into the shaft through holes 42, the third positioning holes 37, and the second positioning holes 23, so that the print head 10, the electric member 30, and the flow path member 20 are fixed to the support portion 40**. This configuration as above also provides effects the same as or similar to those in the foregoing Embodiment 1.

Figure 28:
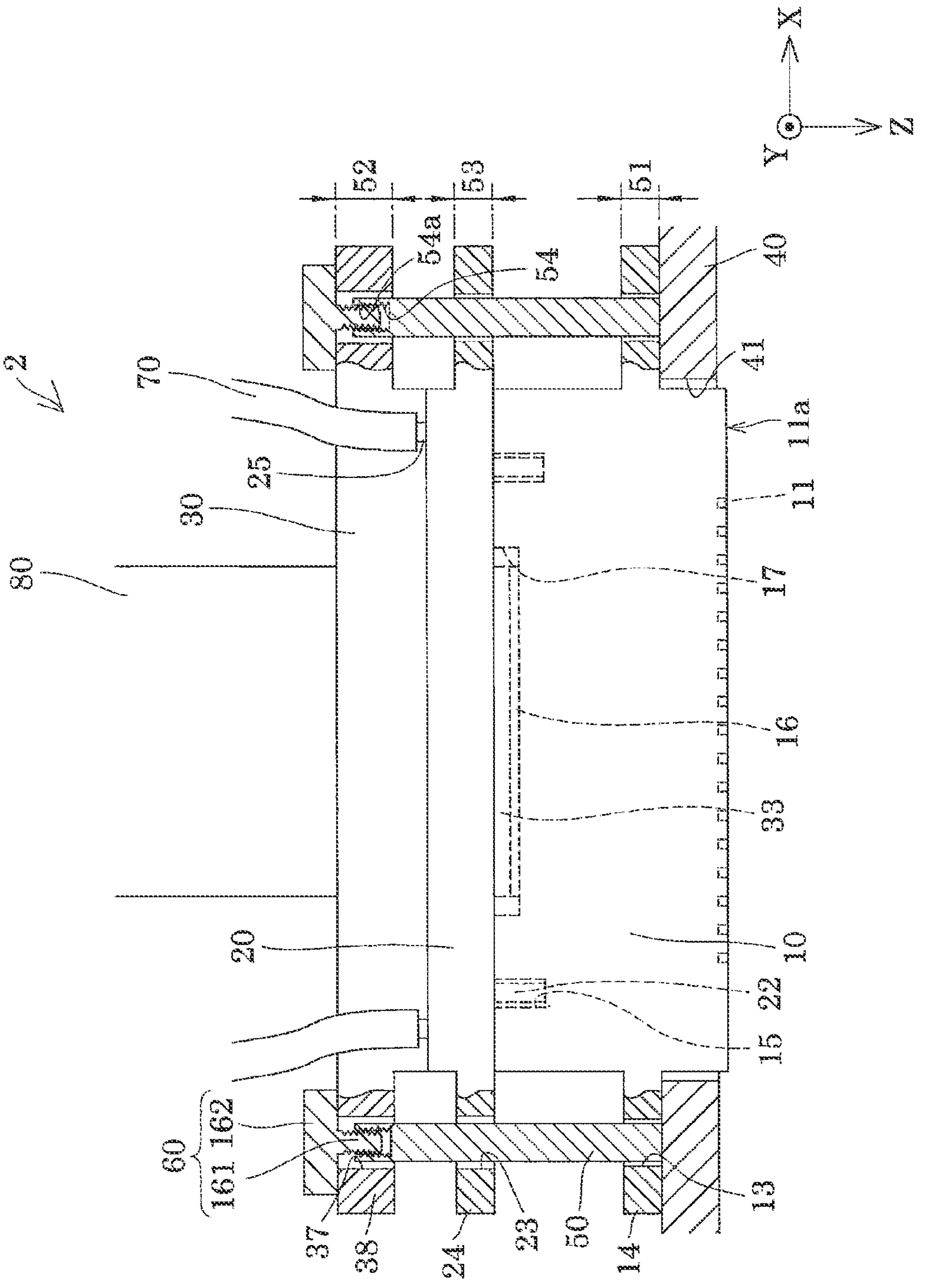
FIG. 28 is a cross-sectional view of an important part of a liquid ejecting unit according to another embodiment.

In the foregoing embodiments, the distal end portion of the shaft 50 has a spiral thread groove **50*a* formed on the outer peripheral surface and serves as an external screw, the fixation hole 61 of the fixing member 60 has a spiral thread groove formed on the inner peripheral surface and serves as an internal screw, and the external screw and the internal screw are engaged by thread engagement. However, the present disclosure is not particularly limited to this configuration. Here, FIG. 28 illustrates a modification example. FIG. 28 is a cross-sectional view of an important part of a modification example of the liquid ejecting unit 2** according to Embodiment 1.

As illustrated in FIG. 28, the shaft 50 has a fixation hole 54 open to the distal end surface, and a spiral thread groove 54*a* is formed along the inner peripheral surface of the fixation hole 54, so that the shaft 50 serves as an internal screw. In contrast, the fixing member 60 has a first fixing portion 161 and a second fixing portion 162, and the size of the second fixing portion 162 is larger than that of the first fixing portion 161 as viewed in the −Z direction. The first fixing portion 161 has a spiral thread groove on the outer peripheral surface and serves as an external screw. Then, the thread groove of the fixation hole 54 of the shaft 50 and the thread groove of the first fixing portion 161 of the fixing member 60 are engaged by thread engagement, so that the shaft 50 and the fixing member 60 are engaged. This configuration as above also provides effects the same as or similar to those in the foregoing embodiments.

Although in the foregoing embodiments, the distal end portion in the protruding direction of the shaft 50 has the thread groove 50*a*, the present disclosure is not particularly limited to this configuration. The shaft 50 may extends further in the protruding direction beyond the thread groove 50*a*. In other words, the thread groove 50*a* is not limited to ones formed on the outer peripheral surface of the distal end portion and includes ones formed between the distal end portion and the proximal end portion of the shaft.

Although the foregoing embodiments illustrate a configuration example in which the first flow-path coupling portion 15 of the print head 10 has a recessed shape, and the second flow-path coupling portion 22 of the flow path member 20 has a protruding shape, the present disclosure is not particularly limited to this configuration. A configuration in which the first flow-path coupling portion of the print head 10 has a protruding shape protruding in the −Z direction, and the second flow-path coupling portion of the flow path member 20 has a recessed shape open toward the +Z direction is possible. Although the first electrically coupling portion 16 of the print head 10 is provided in the slot portion 17, the present disclosure is not particularly limited to this configuration. For example, a configuration in which the electric member 30 has a slot portion open toward the +Z direction, and the second electrically coupling portion 33 is provided in this slot portion is possible. However, a configuration in which neither the print head 10 nor the electric member 30 has a slot portion, and those coupling portions are coupled at the surfaces of the print head 10 and the electric member 30 stacked in the Z-axis direction is possible.

Although in the foregoing embodiments, the support portion 40 is the carriage, for example, the support portion 40 may be a sub-carriage or the like that is mounted on a carriage. In other words, the print head 10 may be directly mounted on a carriage and may also be mounted on a carriage via a sub-carriage.

Although the foregoing ink jet printing apparatus 1 is an example in which the liquid ejecting unit 2 moves in the main scanning direction, the present disclosure is not particularly limited to this configuration. For example, the present disclosure can be applied to a so-called line printing apparatus in which the liquid ejecting unit is stationary, and printing is performed by only moving a recording sheet such as paper in the sub scanning direction. In other words, the support portion 40 in the line printing apparatus may be a print bar or the like that is fixed to the apparatus body and does not move in printing and that supports a liquid ejecting unit.

Although the foregoing embodiments describe an ink jet print head as an example of a liquid ejecting head and describe an ink jet printing apparatus as an example of a liquid ejecting apparatus, the present disclosure is aimed at a wide range of general liquid ejecting units and liquid ejecting apparatuses having a liquid ejecting head. Hence, the present disclosure can be applied to liquid ejecting units and liquid ejecting apparatuses having a liquid ejecting head that ejects liquid other than ink. Examples of other liquid ejecting heads include various print heads used in image printing apparatuses such as printers, coloring-material ejecting heads used in manufacturing of color filters for liquid crystal displays or the like, electrode-material ejecting heads used to form electrodes in organic EL displays, field-emission displays (FEDs), and the like, and bioorganic-substance ejecting heads used for bio-chip fabrication. The present disclosure can also be applied to liquid ejecting units and liquid ejecting apparatuses including such liquid ejecting heads.

What is claimed is:

1. A liquid ejecting unit comprising:
- a liquid ejecting head having a first coupling portion and configured to eject liquid;
- a first member having a second coupling portion configured to couple the first coupling portion;
- a support portion for supporting the liquid ejecting head;
- a shaft protruding from the support portion in a protruding direction; and
- a fixing member, wherein
- the liquid ejecting head has a head through hole,
- the first member has a first through hole, and
- the liquid ejecting head and the first member are fixed to the support portion by engagement between the shaft and the fixing member in a state in which the shaft is inserted into the head through hole and the first through hole in this order.

2. The liquid ejecting unit according to claim 1, wherein
- the shaft has a thread groove,
- the liquid ejecting head and the first member are fixed to the support portion by being held between the fixing member and the support portion by thread engagement between the fixing member and the thread groove in the state in which the shaft is inserted into the head through hole and the first through hole.

3. The liquid ejecting unit according to claim 2, wherein
- the shaft includes
  - a first portion configured to face the head through hole in a state in which the liquid ejecting head is supported by the support portion, and
  - a second portion located between the thread groove and the first portion and configured to face the first through hole in a state in which the first coupling portion and the second coupling portion are coupled,
- a cross-sectional area perpendicular to the protruding direction of the second portion is smaller than that of the first portion, and
- a cross-sectional area perpendicular to the protruding direction of the first through hole is smaller than that of the first portion.

4. The liquid ejecting unit according to claim 3, wherein
- the first portion of the shaft positions the liquid ejecting head relative to the support portion by being press-fitted into the head through hole.

5. The liquid ejecting unit according to claim 1, wherein in plan view in the protruding direction, a difference between a maximum dimension of a portion of the shaft, the portion being inserted into the head through hole, and a diameter of a maximum imaginary circle inscribed in an inner peripheral edge of the head through hole is smaller than a difference between a maximum dimension of a portion of the shaft, the portion being inserted into the first through hole, and a diameter of a maximum imaginary circle inscribed in an inner peripheral edge of the first through hole.

6. The liquid ejecting unit according to claim 1, wherein the liquid ejecting head has a third coupling portion, the liquid ejecting unit further comprises a second member having a fourth coupling portion configured to couple the third coupling portion, the second member has a second through hole, and the liquid ejecting head, the first member, and the second member are fixed to the support portion by engagement between the shaft and the fixing member in a state in which the shaft is inserted into the head through hole, the second through hole, and the first through hole in this order.

7. The liquid ejecting unit according to claim 6, wherein the shaft has a thread groove, and the liquid ejecting head, the first member, and the second member are fixed to the support portion by being held between the fixing member and the support portion by thread engagement between the fixing member and the thread groove in a state in which the shaft is inserted into the head through hole, the first through hole, and the second through hole.

8. The liquid ejecting unit according to claim 7, wherein the shaft includes a first portion configured to face the head through hole in a state in which the liquid ejecting head is supported by the support portion, a second portion located between the thread groove and the first portion and configured to face the first through hole in a state in which the first coupling portion and the second coupling portion are coupled, and a third portion located between the first portion and the second portion and configured to face the second through hole in a state in which the third coupling portion and the fourth coupling portion are coupled, and a cross-sectional area perpendicular to the protruding direction of the second portion is smaller than that of the third portion, and a cross-sectional area perpendicular to the protruding direction of the first through hole is smaller than that of the third portion.

9. The liquid ejecting unit according to claim 8, wherein when the shaft is inserted into the head through hole of the liquid ejecting head, the first through hole of the first member, and the second through hole of the second member in this order, the fixing member is inside the second through hole of the second member as viewed in the protruding direction.

10. The liquid ejecting unit according to claim 8, wherein a cross-sectional area of the fixing member is larger than a cross-sectional area of the second through hole of the second member.

11. The liquid ejecting unit according to claim 8, wherein the first portion of the shaft positions the liquid ejecting head relative to the support portion by being press-fitted into the head through hole, the second portion of the shaft positions the second coupling portion relative to the first coupling portion by being inserted into the first through hole, and the third portion of the shaft positions the fourth coupling portion relative to the third coupling portion by being inserted into the second through hole.

12. The liquid ejecting unit according to claim 6, wherein in plan view in the protruding direction, a difference between a maximum dimension of a portion of the shaft, the portion being inserted into the head through hole, and a diameter of a maximum imaginary circle inscribed in an inner peripheral edge of the head through hole is smaller than a difference between a maximum dimension of a portion of the shaft, the portion being inserted into the first through hole, and a diameter of a maximum imaginary circle inscribed in an inner peripheral edge of the first through hole and smaller than a difference between a maximum dimension of a portion of the shaft, the portion being inserted into the second through hole, and a diameter of a maximum imaginary circle inscribed in an inner peripheral edge of the second through hole.

13. The liquid ejecting unit according to claim 6, wherein in a state in which the liquid ejecting head, the first member, and the second member are fixed to the support portion, the liquid ejecting head is in contact with a portion of the first member, the portion being other than the second coupling portion, and in contact with a portion of the second member, the portion being other than the fourth coupling portion, and the first member is in contact with the second member.

14. The liquid ejecting unit according to claim 6, wherein the first member is a flow path member having a flow path coupled to a flow path of the liquid ejecting head, the second member is an electric member electrically coupled to the liquid ejecting head.

15. The liquid ejecting unit according to claim 6, wherein the first member is an electric member electrically coupled to the liquid ejecting head, and the second member is a flow path member having a flow path coupled to a flow path of the liquid ejecting head.

16. The liquid ejecting unit according to claim 1, wherein the shaft and the support portion have an integrated structure.

17. A liquid ejecting apparatus comprising:

the liquid ejecting unit according to claim 1; and a liquid storing portion configured to store liquid to be supplied to the liquid ejecting unit.

18. A liquid ejecting unit comprising:

a liquid ejecting head having a first coupling portion and configured to eject liquid;

a first member having a second coupling portion configured to couple the first coupling portion;

a support portion for supporting the liquid ejecting head; and a fixing member, wherein the liquid ejecting head has a shaft protruding in a protruding direction, the first member has a first through hole, the support portion has a shaft through hole, the shaft has a thread groove at an end portion of the shaft in the protruding direction, the shaft is press-fitted into the shaft through hole, and the liquid ejecting head and the first member are fixed to the support portion by thread engagement between the fixing member and the thread groove in a state in which the shaft is inserted into the first through hole and the shaft through hole.

19. The liquid ejecting unit according to claim 18, wherein the liquid ejecting head has a third coupling portion, the liquid ejecting unit further comprises a second member having a fourth coupling portion configured to couple the third coupling portion, the second member has a second through hole, and the liquid ejecting head, the first member, and the second member are fixed to the support portion by thread engagement between the fixing member and the thread groove in a state in which the shaft is inserted into the shaft through hole, the first through hole, and the second through hole.

* * * * *